July 30, 1963 C. E. MONSEES ETAL 3,099,304
APPARATUS FOR STACKING AND WEIGHING SLICED FOOD PRODUCTS
Filed March 6, 1961 12 Sheets-Sheet 1

INVENTORS.
HENRY P. REINHART
CLAUDE E. MONSEES

BY
Kane, Dalsimer & Kane
ATTORNEYS

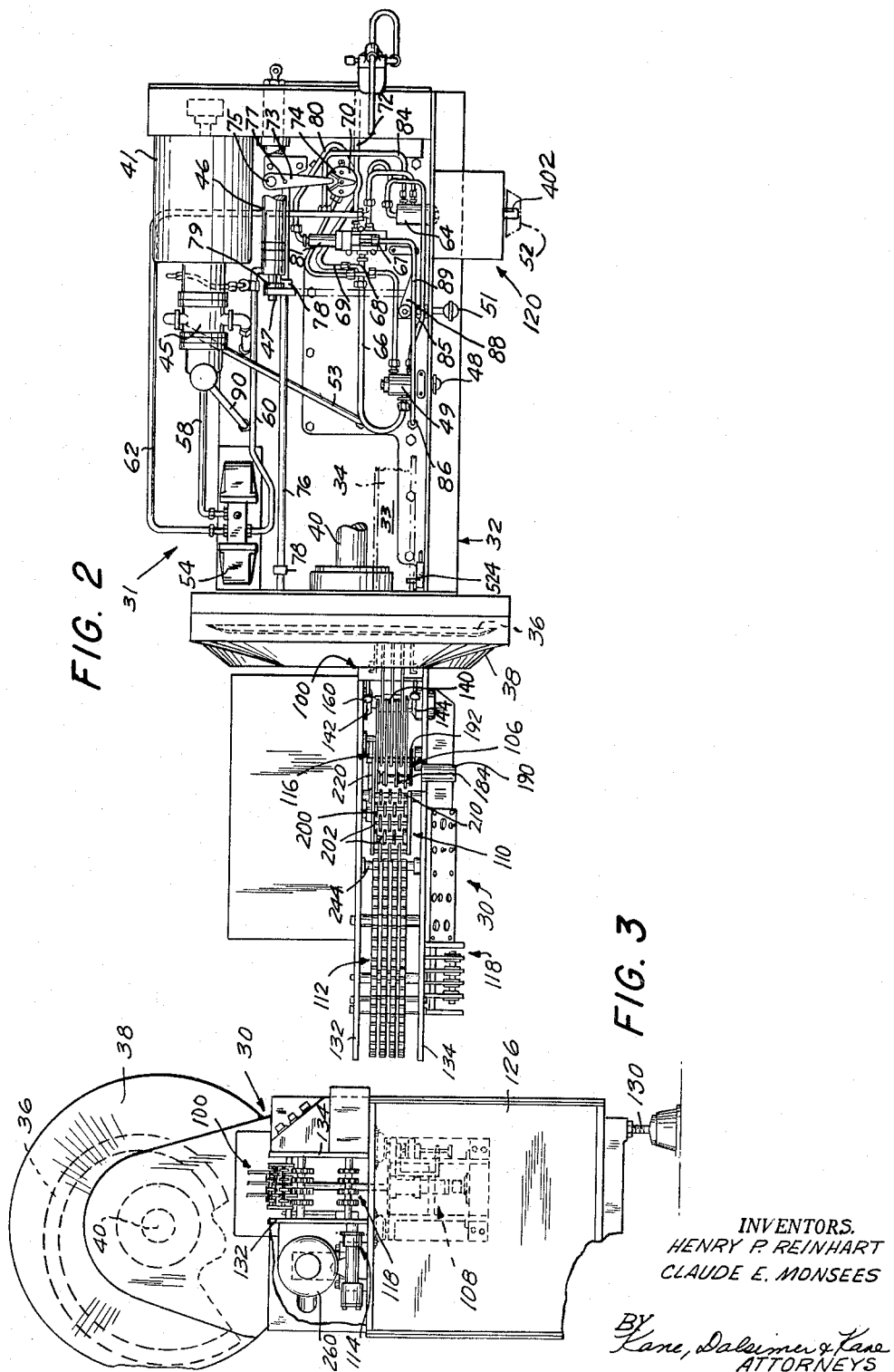

July 30, 1963 C. E. MONSEES ETAL 3,099,304
APPARATUS FOR STACKING AND WEIGHING SLICED FOOD PRODUCTS
Filed March 6, 1961 12 Sheets-Sheet 3
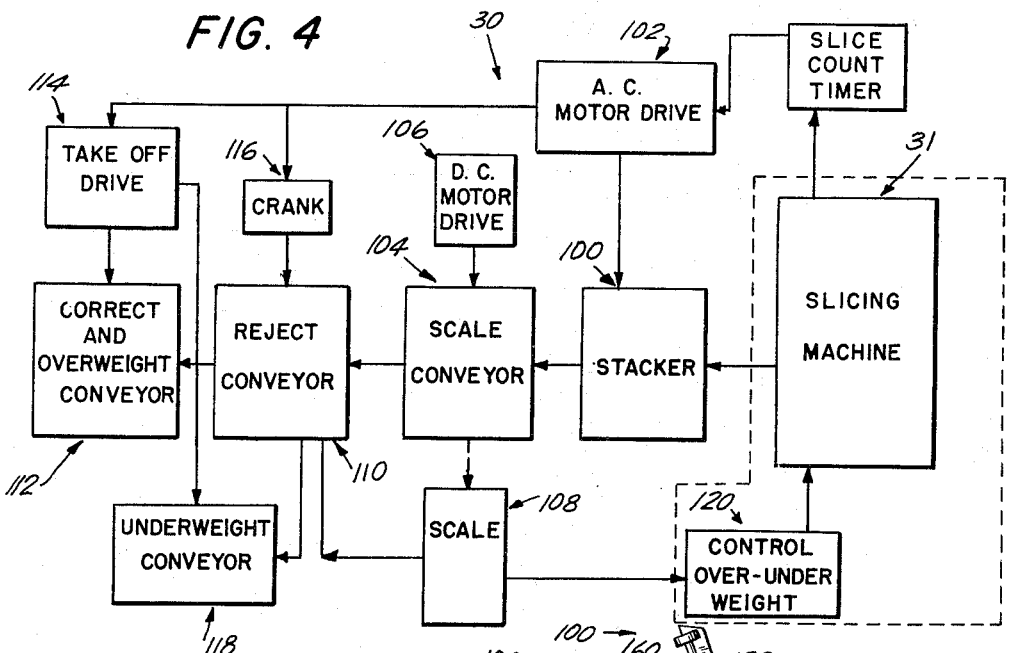
FIG. 4
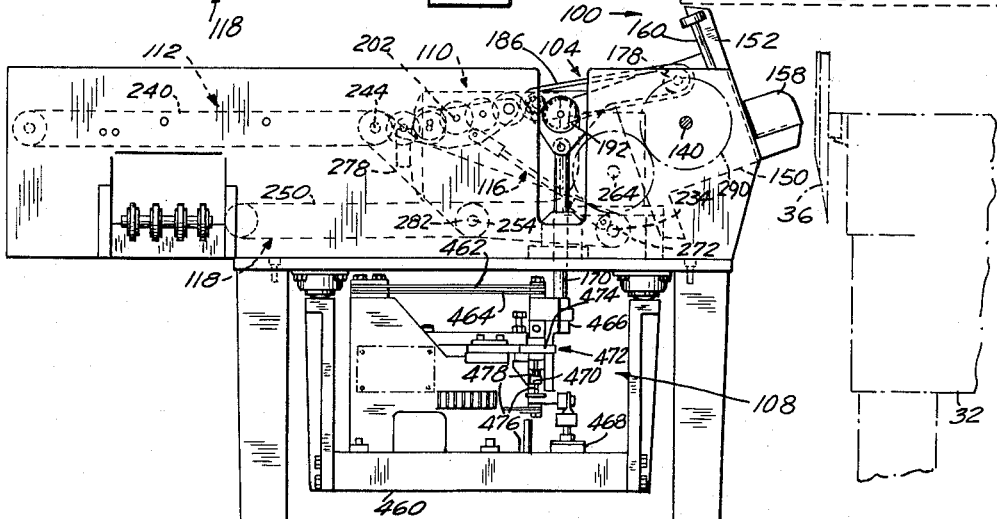
FIG. 5
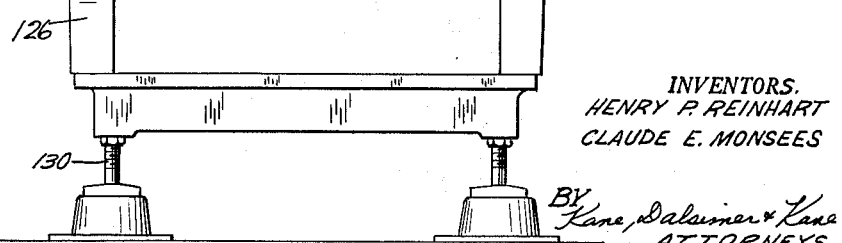
INVENTORS.
HENRY P. REINHART
CLAUDE E. MONSEES
BY Kane, Dalsimer & Kane
ATTORNEYS July 30, 1963 C. E. MONSEES ETAL 3,099,304
APPARATUS FOR STACKING AND WEIGHING SLICED FOOD PRODUCTS
Filed March 6, 1961 12 Sheets-Sheet 8

INVENTORS,
HENRY P. REINHART
CLAUDE E. MONSEES

BY
Kane, Dalsimer & Kane
ATTORNEYS

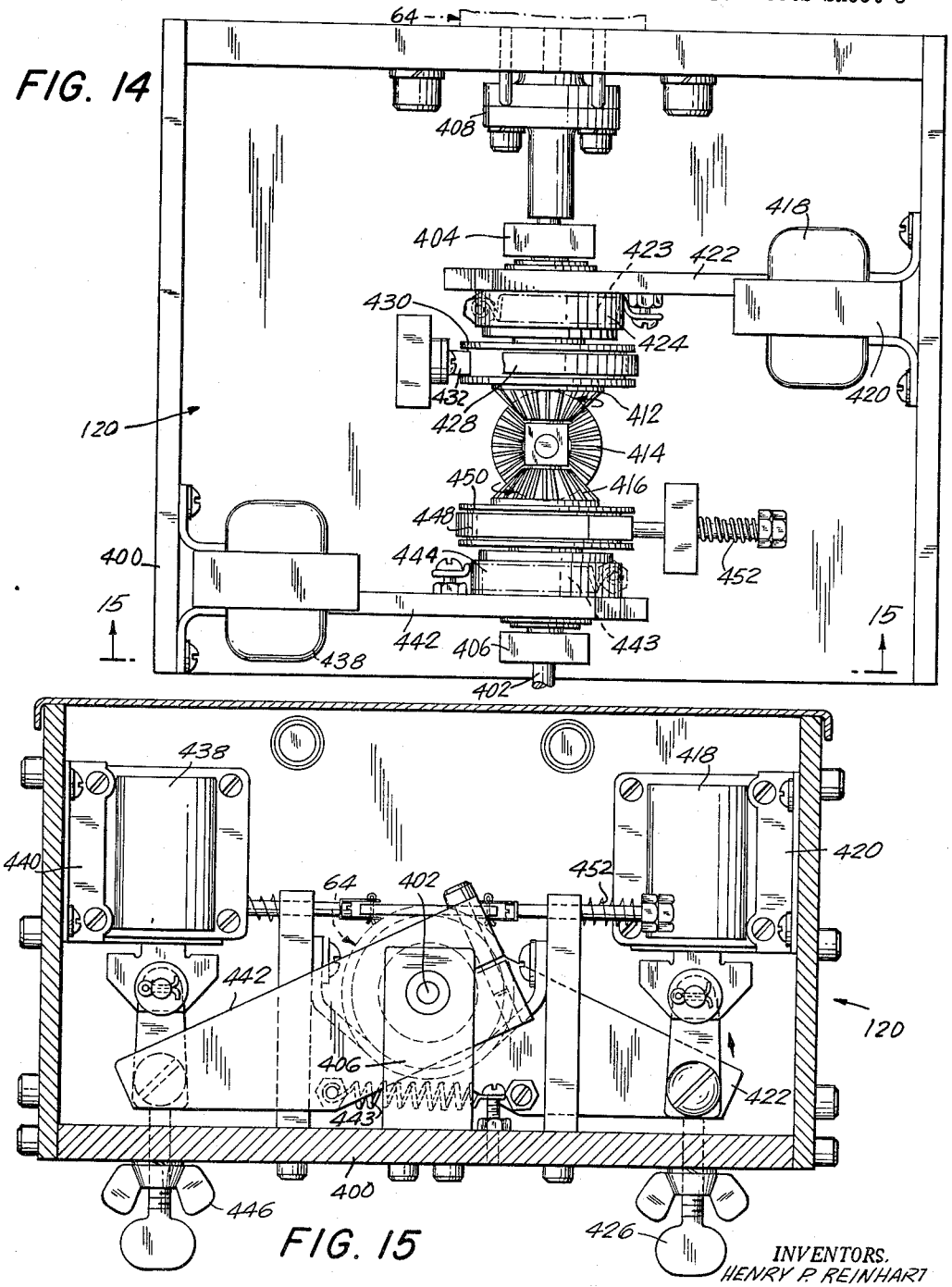

July 30, 1963

C. E. MONSEES ETAL 3,099,304

APPARATUS FOR STACKING AND WEIGHING SLICED FOOD PRODUCTS

Filed March 6, 1961

INVENTORS.
HENRY P. REINHART
CLAUDE E. MONSEES

BY
Kane, Dalsimer & Kane
ATTORNEYS

July 30, 1963   C. E. MONSEES ETAL   3,099,304
APPARATUS FOR STACKING AND WEIGHING SLICED FOOD PRODUCTS
Filed March 6, 1961   12 Sheets-Sheet 12

INVENTORS.
HENRY P. REINHART
CLAUDE E. MONSEES

BY Kane, Dalsimer & Kane
ATTORNEYS

United States Patent Office
3,099,304
Patented July 30, 1963

3,099,304
APPARATUS FOR STACKING AND WEIGHING SLICED FOOD PRODUCTS
Claude E. Monsees and Henry P. Reinhart, Durham, N.C., assignors, by mesne assignments, to Unexcelled Chemical Corporation, New York, N.Y., a corporation of New York
Filed Mar. 6, 1961, Ser. No. 93,634
16 Claims. (Cl. 146—94)

This invention relates to apparatus for stacking and weighing sliced food products, and more particularly, to an apparatus for stacking sliced cold cuts coming from a slicing machine, as well as controlling the weight of the stacks thus produced.

In the preparation of sliced food products, such as cold cuts, it has been common practice in the commercial meat packing field to operate a slicing machine to either continuously or intermittently feed the product to be sliced into the slicing knife. An initial determination is made for a specific number of slices of a certain thickness to have a predetermined weight. The slices are then severed from the body or loaf of the product to be sliced, in accordance with the selected thickness, and then dropped onto a continuously moving conveyor or suitable platform, which respectively, automatically shingle or stack the slices. Beyond this initial station, the shingled or stacked slices, as may be the case, were transferred to a station at which a number of scales were located, and several operators segregated the sliced product for packaging, usually into separate measured quantities of predetermined weight. The operators, under ordinary circumstances, would have available, slices or fractions of a slice, which would be added to a particular group of slices, if the original group removed was of insufficient weight to meet the preset standard. Since the weight of the segregated quantities must be held within close tolerance, the work of accurately measuring and separating the precise quantities was tedious and time consuming and, accordingly, costly.

The feeding mechanism, which supplies the product to be sliced by the slicing machine blade, may have its speed increased or decreased, depending upon the thickness of the slice desired. The knife or blade usually operates continuously at a given rate of speed so that the faster the substances move towards the knife, the greater will be the thickness of the slices, and vice versa. In order to group the slices so that each group contains a predetermined weight, either the number of slices would be changed or the slice thickness for a given number would be altered by an operator in attendance, which in most instances, occurred constantly; and, consequently, the operator would be required to mentally retain the number of slices cut and, subsequently, either manually change the number of their thickness.

It should be understood that there are ever-changing parameters with respect to the particular loaf to be sliced. For example, the cross-section, density and other factors, such as progressive or unexpected changes in relative proportioning of loaf ingredients, which may also depend upon temperature conditions, will be experienced and should be expected. It will be evident that in order to manually control a slicing machine, for any purpose, when either shingling or stacking slices would be a most difficult job for an operator; it is, therefore, one of the principal objects of the present invention to provide a system for automatically controlling the weight of sliced food products.

It is a principal object of the present invention to provide an apparatus for stacking and weighing sliced cold cuts wherein the cost of packaging is reduced in comparison with any of the presently known cold cut stacking machines and at the same time reducing to half the required help for the same tonnage output with less giveaway and substantially no underweights.

The present invention contemplates an apparatus for stacking and weighing slices of cold cuts coming from the discharge end of the slicing machine. The apparatus is initially set to receive a certain number or count of slices with the stacked slices adapted to subsequently pass through a check-weighing station. An operative interconnection is made between the check-weighing station and feed control of the slicing machine to correct the slice thickness if the package is underweight or overweight. The slices coming from the slicing machine are deposited on a stacker turret which rotates when a certain period of time has elapsed, and consequently, a given number of slices have been deposited so as to transfer the stack or group of slices to a small conveyor mounted on a scale which check-weighs the stack. If the stack of slices is overweight, the feed mechanism of the slicing machine for feeding the loaves into the blade is gradually slowed down. On the other hand, if the group of slices is underweight, the speed of the feed mechanism is gradually increased. Thus, the cold cut weigher apparatus uses a feed-back control mechanism for the check-weigher to the feed control of the slicing machine in order to vary the speed of the feed mechanism when the stack of slices is overweight or underweight, as the case may be.

Other objects and advantages will become apparent from the following detailed description of a preferred embodiment thereof which is to be taken in conjunction with the accompanying drawings, in which:

FIG. 2 is a top plan view thereof with certain parts of the slicing machine broken away for purposes of illustrating the hydraulic circuitry thereof involved;

FIG. 3 is a front elevational view of the cold cut weigher with the slicing machine present in the background;

FIG. 4 is a diagrammatic block view for purposes of simplifying the description and illustration of the principles as well as mechanism involved that cooperate in attaining the desired end results incident to the stacking and weighing of the food products;

FIG. 5 is an enlarged side elevational view of the cold cut weigher with the scale door removed for purposes of illustrating the scale interior which serves to conveniently mount the electronics involved, with part of the scale being illustrated in phantom;

FIG. 7a is a somewhat similar elevational view depicting the drive and take-off for actuating the members illustrated in FIG. 7;

FIG. 11 is a rear elevational view of the drive assembly, with reject crank and controls therefor, when viewed along the line 11—11 of FIG. 6;

FIG. 14 is a top plan view of the weight corrector assembly for actuating and adjusting the flow control valve of the slicing machine in response to signals received from the weigher;

FIG. 15 is a vertical section taken along the line 15—15 of FIG. 14;

In the accompanying drawings, the stacking and weighing apparatus 30 is shown applied to the discharge end of a slicing machine 31 so that the sliced products from the slicing machine are discharged onto a stacker of our apparatus in accordance with an established measure. The measured quantities are then weighed and segregated from the other sliced products coming from the slicing machine, with a following transfer of the measured quantities to further packaging stations if of an adequate weight, or, on the other hand, transferred to a reject station at which the proper weight is attained.

Slicing Machine

Our improved apparatus may be used with different types of slicing machines. The drawings illustrate one type of slicing machine 31 to which our invention is particularly applicable. However, it should be understood that the illustrated slicing machine does not per se constitute the present invention.

The illustrated slicing machine is available commercially under the name Hydromatic Slicer and is fully disclosed in the operating instructions for the ANCO No. 832 Hydromatic Shear-Cut Slicer (dated September 17, 1959), published by the manufacturer, The Allbright-Nell Co. of Chicago, Illinois. The ANCO No. 832 is a companion of the ANCO No. 827 Hydromatic Bacon Slicer fully disclosed in the operating instructions for this machine (revised May 14, 1952), published by the same manufacturer, as well as being disclosed in commonly assigned U.S. Patent Nos. 2,812,792 granted on November 12, 1957, and 2,903,032 granted on September 8, 1959.

Figure 1:
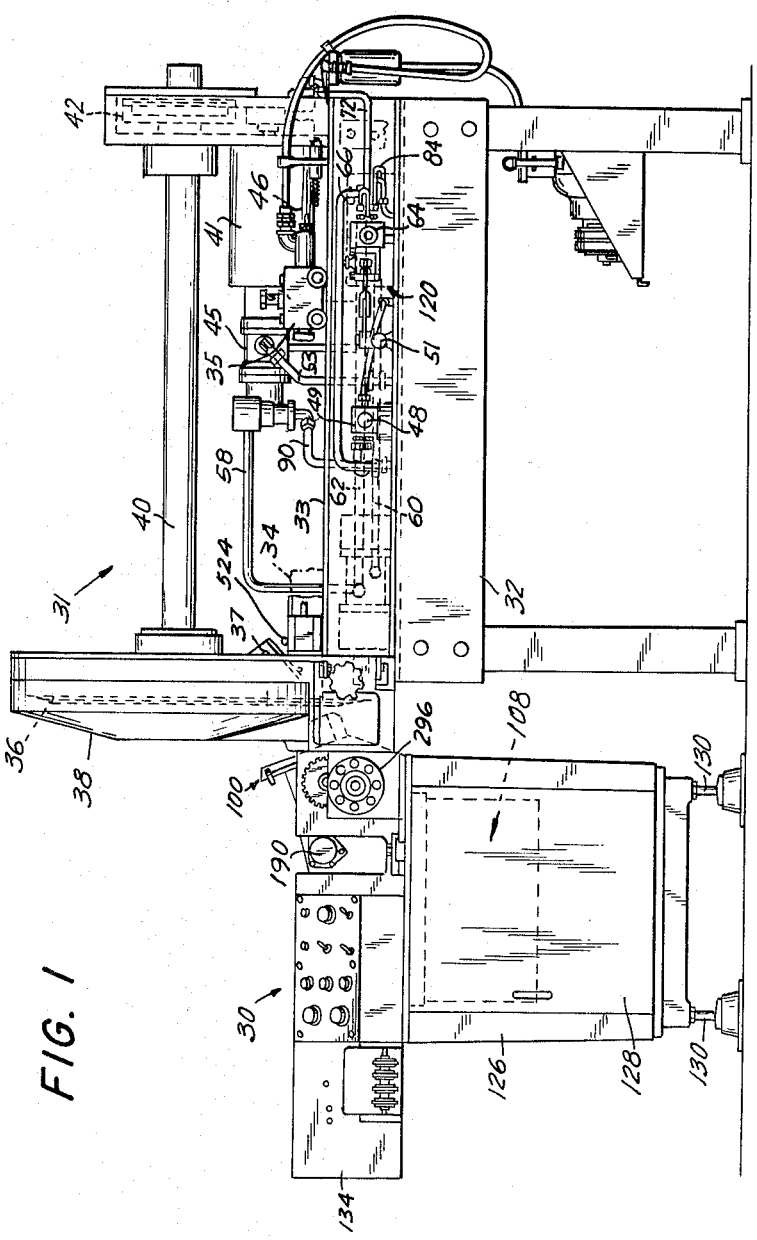
FIG. 1 is a side elevational view, partially schematic, of the apparatus, in accordance with the teachings of the present invention, for stacking and weighing sliced food products in association with a slicing machine.
Figure 6:
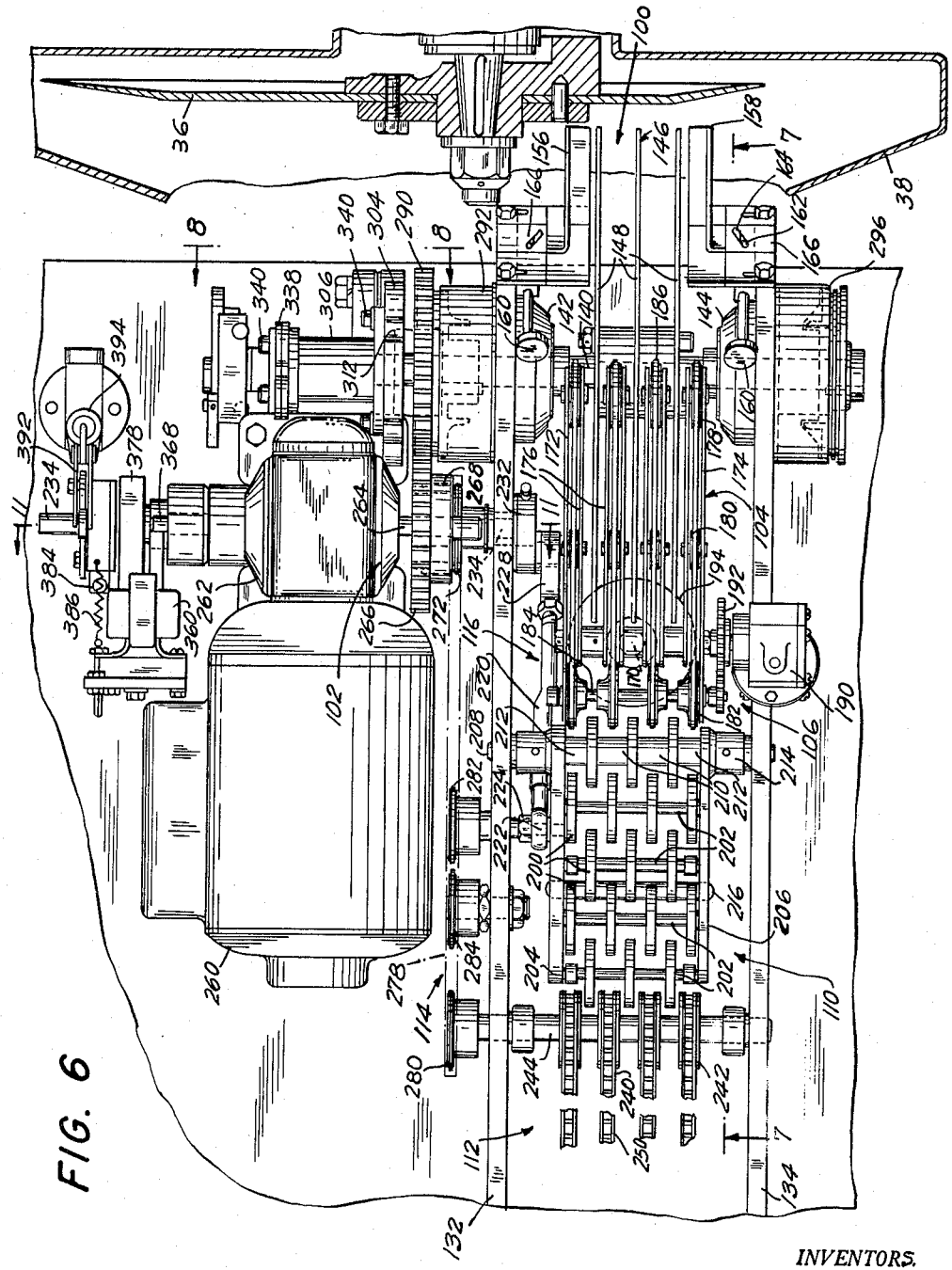
FIG. 6 is an enlarged top plan view of the weigher illustrating the stacker and conveyors present on or adjacent the scale together with the discharge end of the slicing machine.

The relevant portions of the slicing machine 31 are shown more particularly in FIGS. 1, 2 and 3 inclusive, and comprise a supporting table 32 having a platen or feed bed 33 over which the product, such as meat-loaf, luncheon meat, or other varieties of cold cuts shown at 34, is fed by a pusher or feeder 35 to the slicing knife or blade 36 to be sliced and then discharged onto the stacking and weighing apparatus 30. In this connection, pusher 35 may include one of many loaf gripping means, as for example, the illustrated vacuum gripper 39 which through suction by a suitable vacuum motor is adapted to secure the loaf upon contact.

The forward or leading edge of the meat product 34 is pressed downwardly against the bed so as to properly engage the blade for slicing by means of the spring pressure plate 37 suitably supported adjacent to the blade. The blade is encased in a housing 38 which serves to protect the operator and also to prevent the particles of sliced product from being thrown outwardly from the blade by centrifugal force.

The blade is one conventional type of rotary cutting blade and is in the form of an eccentric disc or dished blade, which is adapted to be rotated at relatively high speeds. Although both types of blades perform satisfactorily, the dished blade is somewhat preferred. The portion of the blade having the greatest radius serves to slice the leading edge of the product 34 while the portion of the blade having the minimum radius provides clearance for the product to be fed outwardly, permitting the initiation of the next slicing operation. The product 34 is continuously fed forwardly by the pusher 35, and each cycle of rotation of the blade produces another slice.

As will be observed in FIGS. 2 and 3, the axis rotation of the blade 36 is disposed in a horizntal plane, somewhat offset with respect to the path of travel of the product being cut. The principle of slicing or cutting embodies a much longer draw cut of the blade 36. Resultant forces affecting the slice produced tend to lay it down on the receiving stacker or conveyor, as the case may be, rather than pull it towards the back of the slicer 31. This principle results in more precise stacking or shingling with the cutting action being more gentle with much less impact from the blade, and consequently, less oscillation of the product being sliced at high speed.

The thickness of the slice can be varied by adjusting the speed of the pusher 35. Thus, when the pusher feeds the product forwardly at a relatively higher rate of speed, the thickness of the slices are increased; and when the pusher operates at a relatively lower rate of speed, the thickness of the slices are reduced.

The blade 36 is mounted at the end of a rotatable shaft 40, which is suitably journaled; and the shaft, in turn, may be driven by an electric motor 41 through suitable driving mechanism therefor. Motor 41 also operates hydraulic pump 45, which provides the hydraulic fluid under pressure for the operation of the hydraulic mechanism. In this connection, the pusher 35 is reciprocated by hydraulic cylinder 46 through piston 47 which is operatively connected to the pusher so as to automatically feed the product 34 to be sliced toward the blade 36, and then automatically retract the pusher after completion of the feed stroke.

When motor 41 is operated, it causes the rotation of the blade 36 and also the operation of the hydraulic pump 45 so as to generate the necessary hydraulic pressure for the operation of the remaining mechanism. The pusher 35 is caused to reciprocate by means of the handle 48 of control valve 49. When the handle is pushed inwardly or depressed, it causes the initiation of operation or reciprocation of the pusher 35. When the handle is pulled outwardly or retracted, it stops the reciprocation of the pusher 35.

Control lever 51, mounted on the side of the slicing machine 31, causes the rapid traverse or shifting of the pusher 35 in either direction. When the lever is in neutral or center position, the pusher reciprocates normally. When it is desired to shift the pusher rapidly in a forward direction, the lever is shifted forwardly towards the blade 36; and when it is desired to cause the pusher to shift in a rearward direction, the lever is shifted away from the blade.

A suitable feed control dial 52 is also provided on the side of the slicing machine 31. Rotation of the dial in one direction causes the speed of the pusher 35 in a forward direction to be increased, and the rotation of the dial in the opposite direction similarly causes the speed of the pusher in a forward direction to be decreased.

Hydraulic Circuits for the Slicing Machine

The hydraulic circuits for causing the reciprocation of the piston 47 in cylinder 46 and whereby the various controls 48, 51 and 52 are caused to operate are shown in FIG. 2. Thus, the hydraulic pump 45 pumps the hydraulic fluid from the supply tank (not shown) through main supply line 53. As mentioned in the foregoing, the movement of the pusher 35 is stopped when a predetermined measure of sliced meat product has been discharged by the slicing machine 31 onto the weighing apparatus 30 for stacking and weighing the sliced product. To arrest the movement of the pusher 35 until it is desired to initiate once again the slicing of the meat product 34, a double solenoid valve 54 is preferably employed which functions to equalize the pressure on both sides of the piston 47, thereby stopping the displacement of this piston within the hydraulic cylinder 46. Double solenoid valves of a type usable with the present invention are commercially available, a source being Beckett-Harcum, Wilmington, Ohio. For details of a double solenoid valve contemplated by the present invention, reference is made to commonly assigned U.S. patent application SN 745,406, filed June 30, 1958, now Patent No. 2,969,099 granted January 24, 1961. With respect to the connection of the valve with the existing hydraulic circuitry for the slicing machine 31, those skilled in the art should refer to this patent application, as well as the instruction manual for the Cashin Weigh-Convey System, model "D" (dated January, 1960) publshed by Cashin, Inc., Albany, New York.

The main supply of hydraulic fluid from pump 45 travels through a suitable port in the relief valve, to be described shortly, by a line 53. During the normal slicing cycle when pusher arm 35 is displacing the meat product 34, the hydraulic fluid passes through the hydraulic circuits of the slicing machine 31 and through the line 60, which communicates with the forward part of the cylinder 46 and front face of the piston 47. The fluid passing through the line 60 is adapted to flow through the double solenoid valve 54 into line 62, tapped into the flow control valve 64 and then ultimately into the supply tank (not shown).

As will be appreciated, hydraulic fluid entering the control valve 49 through line 53 will flow outwardly through line 66 to the spring centered reversing valve 67 when the handle 48 for the valve 49 is pushed inwardly. In addition to flowing to the spring centered reversing valve, oil from line 66 passes through couplings 68 and line 69 to pilot valve 70. Oil entering the reversing valve 67 may leave through line 62 through double solenoid valve 54 and line 60 to the forward end of cylinder 46 to cause the pusher 35 to retract away from the blade 36, or it may leave through line 72 so as to enter the rear of cylinder 46 and thereby cause the pusher 35 to feed forwardly toward the cutting blade 36.

The pilot valve 70 controls the reversing valve 67 so as to determine whether the hydraulic fluid will exit through the line 62 or the line 72. The pilot valve 70 in turn, is controlled by the reciprocation of the pusher 35. Thus, the lever arm 73, which controls the position of the pilot valve 70 through interengagement with the finger lever 74, is pivotally mounted to the frame at 75 and to the pilot control rod 76 at the point 77. The pilot rod 76 is longitudinally reciprocal and has a pair of adjustable collars 78 near the opposite limits of movement of the pusher 35, which are engaged by the arm 79 at the two extreme limits of movement so as to shift the pilot rod 76 in a direction of movement of the pusher 35. Thus, when the pusher 35 is shifted to the right, pilot rod 76 will shift to the right when arm 79 engages collar 78, thereby pushing the arm 73 to the right and rotating pilot valve 70 clockwise, as viewed in FIG. 2, a predetermined amount. When the pilot valve 70 is in this position, the hydraulic fluid coming through line 69 is blocked by the pilot valve and cannot exit through line 80 to the control portion 81 of reversing valve 67. Under those circumstances, the spring centered reversing valve 67 is in its centered position and causes the hydraulic fluid entering the reversing valve 67 to exit through the line 72 to the rear portion of the hydraulic cylinder 46, with the result that the piston 47 and, consequently, the pusher 35 are fed towards the cutting blade 36.

During the meat product slicing cycle, the double solenoid valve 54 functions to close the passage provided by line 58, thereby preventing the pressurized fluid from communicating with line 60 and the forward part of the hydraulic cylinder 46. When a predetermined quantity of sliced product has been deposited by the slicing machine 31 onto the stacking and weighing apparatus 30, an electronic network, to be described, subsequently energizes the double solenoid valve 54 in such a manner that a passage will be provided affording communication of line 58 with line 62, thereby providing access for the pressurized fluid flowing from pump 45 to the supply tank through the double solenoid valve 54. Simultaneously therewith, the line 60 will be sealed by parts of the valve 54, thereby stopping further movement of piston 47 and, consequently, the forward movement of pusher arm 35.

As will be more fully understood shortly, the double solenoid valve 54 will be energized after a predetermined period of time following the deposit of the predetermined quantity of sliced product by the slicing machine 31 on the weighing apparatus 30, in such a manner that the valve 54 will assume a position at which it will permit line 60 to communicate with line 62, as is the case during the normal slicing cycle of the slicing machine 31.

When the pusher 35 shifts to the desired forward limit of movement, arm 79 will engage the other collar 78, shifting the pilot rod 76 to the left, with the result that arm 73 is pivoted to the left causing the pilot valve 70 to rotate counterclockwise a predetermined amount. Under those circumstances, the pilot valve 70 is opened to permit flow of the hydraulic fluid under pressure through line 69, pilot valve 70, line 80 to the control portion 81 of the reversing valve 67. The hydraulic pressure from line 80 entering the control portion 81 shifts the control inwardly against the force exerted by a spring therein, with the result that hydraulic fluid from the reversing valve exits through the line 62 and enters valve 54, line 60 and the forward end of the hydraulic cylinder 46, causing the piston 47 and pusher 35 to shift rearwardly away from the blade 36.

This cycle of operation with automatic reversing continues as long as control valve 49 remains open. The speed at which the pusher 35 shifts in a forward or feeding direction is controlled by feed control dial 52 of control valve 64. Thus, as the piston 47 in the cylinder 46 is shifted to the left, as viewed in FIG. 2, the hydraulic fluid in the forward part of the cylinder must exit through the line 60. Reversing valve 67 is so constructed that the fluid leaving the cylinder through line 60 cannot pass through the reversing valve when it is centered, but must flow through line 62 to the feed control valve 64. By rotating the feed control dial 52, the size of pressure balanced orifice opening in the feed control valve can be increased or decreased so as to increase or decrease respectively, the flow of hydraulic fluid outwardly through line 84 and back to the supply tank. By enlarging the opening, it will be appreciated that the speed of the feed is increased. By decreasing the size of the opening, the speed of the feed is decreased. As will become apparent shortly, an operative interconnection is provided between the stacking and weighing apparatus 30 and the control valve 46 to regulate the size of this pressure balanced orifice opening, in order that the speed of feed of the pusher 35 can be adjusted for the selected quantity of slices to be discharged by the slicing machine 31, and correspondingly change the slice thickness to control the weight within prescribed limits of the stacked slices constituting a package of the desired weight.

Control valve 49 is connected by a line 85 to feed control 64. The control valve 49 permits the fluid pressure to pass through the line when the valve 49 is closed. This maintains a constant pressure in the feed control valve 64 so as to prevent any lag or a resultant increase in the size of the slices upon each reversing in the direction of movement.

Feed control valve 64 does not serve to control the speed of the pusher 35 in a rearward direction. When piston 47 shifts in cylinder 46 to the right, as viewed in FIG. 2, the hydraulic fluid to the right of the piston exits FIG. 2, and is permitted to flow through reversing through line 72 and is permitted to flow through reversing valve 67, when the control has been shifted inwardly by fluid pressure at 81, and the fluid flows outwardly to return line 86 from which it re-enters the reservoir or supply tank.

When control lever 51 is pivoted rearwardly, through the action of cranks 88 and 89, it causes reversing valve 67 to assume the same position as when fluid pressure is applied to the control portion 81. In other words, it causes fluid under pressure to pass through the reversing valve and thence through line 62, valve 54, and line 60 to the forward portion of cylinder 46. The hydraulic fluid at the rear of the cylinder can leave through line 72 and thence pass through reversing valve 67 and through return line 86 to the reservoir or supply tank.

When the lever 51 is pivoted forwardly or to the left, as viewed in FIG. 2, it causes the fluid under pressure to pass through reversing valve 67 and line 72 to the rear portion of cylinder 46. The fluid returning from the forward portion of the cylinder 46 through the line 60 need not pass through the feed control valve 64, but can now pass through reversing valve 67 through line 86 to the reservoir. This permits the pusher 35 to travel at a much greater rate of speed.

A relief line and valve 90 is provided between the hydraulic pump 45 and a reservoir or supply tank so as to prevent too much pressure from building up in the hydraulic system. The relief valve can be adjusted to the desired pressure, as for instance, 150 pounds.

The slicing machine 31 and the hydraulic control circuits, therefore, as shown and described are illustrative of the type of device to which my stacking and weighing apparatus 30 may be applied. As stated, the slicing machine is commercially available and does not per se constitute our invention.

*Stacking and Weighing Apparatus*

As stated in the foregoing, a measuring means in the form of a timer, to be described in detail shortly, co-operates in determining the number of slices to be deposited by the slicing machine 31 onto the stacking and weighing apparatus 30. In this connection, the timer will serve to regulate the operation of the double solenoid valve 54, and consequently, the pusher 35.

Although it should not be considered as an equivalent, a pure counting mechanism can be employed in lieu of the slice count timer contemplated by the present invention.

The slices of the meat product are stacked on a stacker assembly 100 until a predetermined number of slices has been deposited thereon, at which time the valve 54 is actuated to stop the forward movement of the pusher 35 and simultaneously therewith operate the stacker mechanism 100 by main drive 102 to transfer the predetermined quantity of stacked sliced product onto a constantly driven scale or weigh conveyor assembly 104. The scale conveyor mechanism is constantly driven by drive 106 and, at the same time, is mounted so as to actuate a scale 108 upon reception of the stacks of sliced product. If a stack on the scale conveyor is of correct weight, or on the other hand, overweight, a reject conveyor assembly 110 will serve to transfer such stacks from the scale conveyor to a correct and overweight conveyor 112 from whence the stacks are transferred to further packaging stations along the cold cut line. The correct and overweight conveyor 112 is driven by drive 114 which is coupled with drive 102. However, if the scale 108 registers underweights of sliced product in a particular stack being transferred by the scale conveyor 104, the scale 108 will send a signal to the drive 102 which will then actuate the crank mechanism 116 which, in turn, will actuate the reject conveyor mechanism 110 so that the underweight stacks of sliced product coming from the scale conveyor will not be transferred to the correct or overweight conveyor but will be diverted and transferred to an underweight conveyor 118. An operator will add one or more slices or a part or fraction of a slice to the underweight stack and then pass it on for further packaging. The underweight conveyor is also driven by the take-off drive 114 coupled with the drive 102.

As will be appreciated from the foregoing, both correct, as well as overweight stacks of sliced product are passed by the reject conveyor 110 from the scale conveyor 104 to the correct and overweight conveyor 112. However, above a prescribed limit, overweight stacks will be registered by the scale 108 and transmitted to an over and underweight control 120 which has the effect of controlling the size of orifice of the flow control valve 64 such that the feed 35 will travel at a slower rate of speed, thereby feeding the selected product 34 at a slower rate into the slicing blade 36. On the other hand, when underweights are registered by the scale 108, a signal is transmitted to the over and underweight control 120 such that the speed of the feed 35 is increased, thereby increasing the thickness of slice cut by the blade 36. The control 120 operates on an impulse principle whereby the size of the orifice opening of the control valve 64 is changed in increments and not instantaneously from one size to another, depending on the extent of overweight or underweight. All of this will certainly become apparent from a detailed description of the control 120, which will follow shortly.

With every underweight stack weighed by the scale 108, the reject conveyor 110 will be actuated such that the underweight stacks will be transferred to the underweight conveyor 118 rather than passed onto the correct and overweight conveyor 112. The reject conveyor 110 will remain in this position until a correct or overweight is registered by the scale 108, at which time the reject conveyor 110 will resume its original position and transfer such stacks onto the correct and overweight conveyor 112.

As will be observed, the stacking and weighing apparatus 30 is anchored to a scale cabinet 126 having a hinged door 128 and four adjustable legs 130. In this connection, a pair of vertical plates 132 and 134 advantageously extend vertically from the top of the cabinet 126 and serve to conveniently journal those shafts finding support therebetween or thereon.

*Stacker*

Thus, the turret stacker 100 is disposed between this pair of vertical plates 132 and 134 and includes a turret shaft 140 suitably journaled for rotation by means of journals 142 and 144.

As mentioned in the foregoing, the actuation of the turret assembly 100 is effected by the drive assembly 102 which is synchronized with the operation of the feed 35 of the slicing machine 31. This drive 102 will be described in detail shortly.

Figure 7:
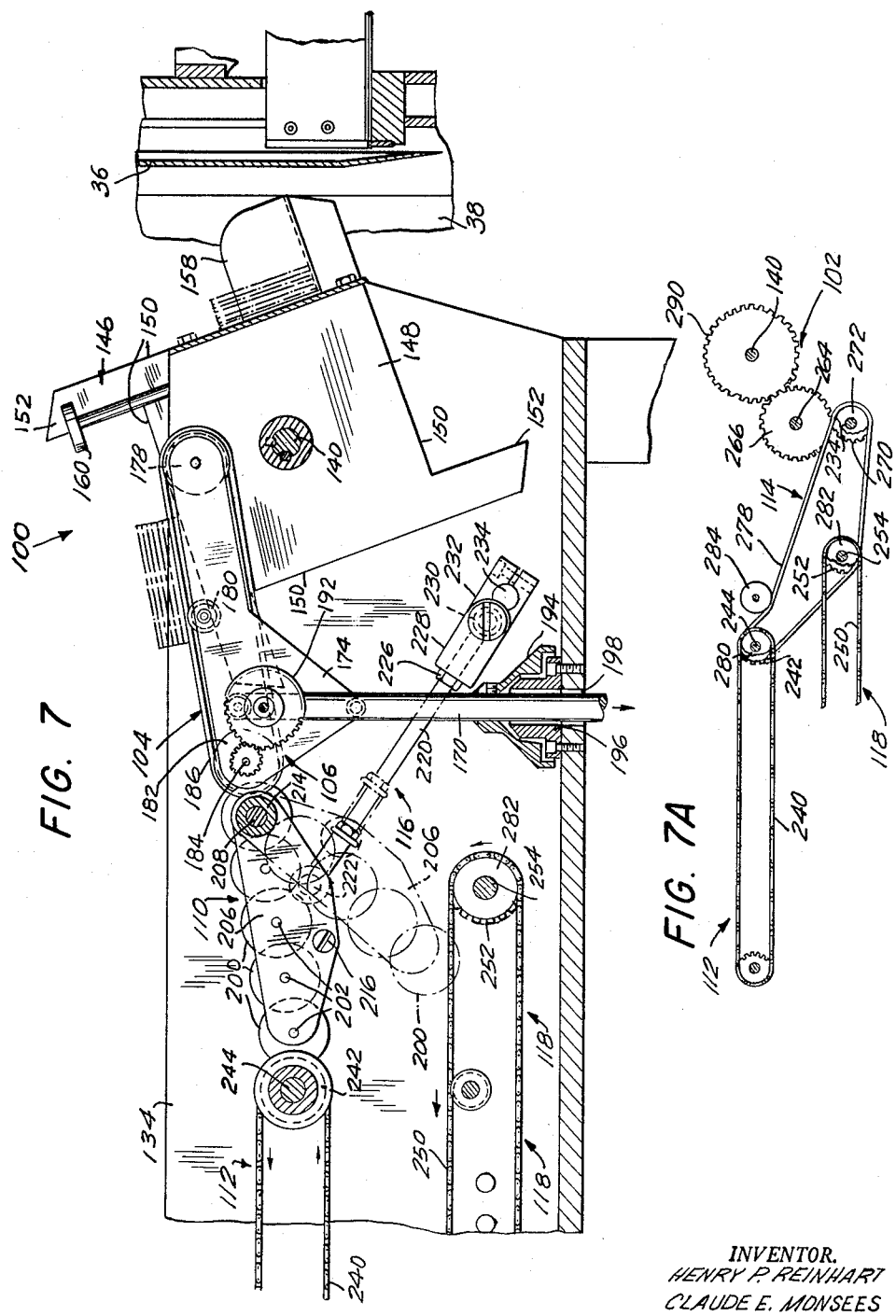
FIG. 7 is a fragmentary side elevational view taken along the line 7—7 of FIG. 6 showing details of the stacker, scale and reject mechanism.

The turret 146 is keyed to the main turret shaft 140 and, in the illustrated embodiment, includes three properly spaced plates 148, each of which includes four aligned and substantially planar sliced product receiving edges 150 and transversely extending ribs 152 which cooperate with the receiving edges for catching and retaining the slices as they are produced by the slicing blade 36. As will be more fully disclosed shortly, when the selected number of slices has been deposited upon the slice receiving edges 150 disposed in receiving relationship with respect to the blade 36, the turret shaft 140 will be rotated a quarter turn smartly such that the next set of receiving edges 150 will be in proper receiving relationship. The turret 100 with its mounted slices will thusly rotate a quarter turn counterclockwise, as viewed in FIG. 7 such that the stack of slices will be deposited upon the scale conveyor 104.

It will be noticed that the edges of the plates 132 and 134 adjacent the slicing machine 31 include a pair of spaced side guides 156 and 158. These guides 156 and 158 may be adjustable transversely towards and away from the turret blades 146 for purposes of accommodating the particular product being sliced. These guides 156 and 158 serve to cooperate in properly stacking the sliced product on the receiving edges 150 and, at the same time absorb some of the impact of the slices as they are cut and thrown by the slicing blade 36 onto the turret 100. The side guides 156 and 158 may be adjustable through the associated adjusting screws 160 each of which has projecting from its inner end a pin 162 disposed in a slot 164 of the slide portion 166 of the companion guide. Thus, by turning the screw 160, the pin 162 will cam against the edges defining the slot 164 so as to actuate the slide portion 166 and thus the side guide inwardly or outwardly with respect to the turret blades 146, as may be the case.

Weigh Conveyor

The weigh or scale conveyor transfers the stacked slices from the turret 100 to the reject conveyor 110. The scale conveyor 104 is an assembly supported by the scale 108, and the weight of the stacked slices thereon will accordingly be registered by the scale 108. Under such circumstances, the weight is transferred through the tubular support 170, which is advantageously coupled with the scale 108. A pair of brackets 172 and 174 are advantageously located at the upper end of the tube 170. Interposed between these two outside brackets 172 and 174 are a number of properly spaced plates 176 which are also mounted by the upper end of the tube 170 and cooperate with one another, as well as with such brackets in mounting the pulleys 178 of the leading end of the scale conveyor 104. In addition, reduced pulleys 180 are rotatably mounted between these bracket plates, as shown, for purposes that will become evident shortly.

As stated in the foregoing, these plates are mounted by the upper end of the tube 170 and are suitably spaced from one another to not only rotatably mount the leading end pulleys 178 and the intermediate pulleys 180, but, at the same time, advantageously receive therebetween the turret blades 146 so that the stacked sliced product can be readily transferred from the stacker 100 onto the receiving surfaces of the scale conveyor 104.

In this connection, the receiving surfaces may be presented by a number of conveyor belts or chains substantially as illustrated. The trailing end of the conveyor assembly 104 includes another series of pulleys 182 suitably keyed to a rotatable shaft 184 journaled between the outside brackets 172 and 174. Thus, the trailing end of the belts or chains 186, as the case may be, are placed over the trailing end pulleys 182. It should now be evident that the intermediate pulleys 180 serve to prevent sagging of the chains or belts 186 as the stacks of sliced products are passed over the belts. The conveyor 104 is constantly driven by a speed adjustable motor 190, which will advantageously serve to rotate the shaft 184 through a suitable gear train 192, with both the motor and gear train being mounted by the exterior brackets.

The association of the tube 170 is such that a sleeve 194 suitably affixed thereto is telescopically received by a tubular spindle 196 suitably bracketed to the top of the scale cabinet 126, as shown. The tube 170 thus extends through the spindle 196 and a suitable opening 198 in the top of the cabinet 126 to be suitably connected to the internal mechanism of the scale 108.

Reject Conveyor

Referring now to the reject conveyor 110, it will be noted that a plurality of rollers 200 are arranged in rows parallel one another, with the rollers 200 in adjacent rows staggered and somewhat interdigitated such that a plane will extend tangentially through the upper periphery of all the individual rolls 200. Thus, the rolls 200 of the reject conveyor 110 will define a stacked product receiving surface coinciding with this plane. The rollers 200 are mounted on the necessary number of shafts 202, which are pivotally mounted on and between a pair of brackets 204 and 206. In addition, a row of staggered rollers 200 are rotatably mounted on a shaft 208 which not only extends between the brackets 204 and 206 but plates 132 and 134. As will be appreciated shortly, this shaft 208 serves to pivotally mount the brackets 204 and 206 and, consequently, the shaft 202 with mounted rollers therebetween for purposes of accomplishing the desired rejection of the stacked products of improper weight. The rolls 200 on the shaft 208 are properly spaced by means of spacer sleeves 210 and sleeves of reduced size 212. Spacers 214 at each end of the shaft 208 serve to adequately locate and space the brackets 204 and 206. To complete the proper spacing of the brackets 204 and 206, a spacer rod 216 advantageously extends therebetween.

As mentioned in the foregoing, the reject conveyor 110 is adapted to pivot about shaft 208 to place the stacked product coming from the weigh conveyor 104 onto the conveyor 118, when an underweight stack is encountered. On the other hand, if the proper weight is made, the reject conveyor 110 will simply transfer the stacked products from the weigh conveyor 104 onto the correct and overweight conveyor 112.

If weight under the prescribed lower limit is the case, the reject conveyor 110 will, as stated, pivot about the shaft 208. The mechanism for accomplishing this works through the crank 116, which includes the usual crank arm 220 which has one end thereof pivotal on a stud 222 and adequately anchored thereto by means of a nut 224. Means may be conveniently provided for adjusting the effective length of the crank arm 220 as illustrated intermediate its ends. The other end of the crank arm 220 is secured by means of a nut 226 to a plate 228 which, in turn, is pivotally mounted on a pin 230 and suitably secured thereto. The pin 230 is pivotally mounted on arm 232 which is keyed to the crank shaft 234. The actuation of the crank shaft and, consequently, the crank 116 will be explored in detail shortly. At the moment, it will suffice to say that when proper weights are registered, the reject conveyor 110 will assume the position illustrated by solid lines, as for example in FIG. 7, such that the stacked products are transferred from the weigh conveyor 104 onto the correct and overweight conveyor 112.

When an underweight is registered, however, the crank shaft 234 is actuated such that the arm 232 is rotated to thereby retract the arm 220. Accordingly, this retraction of the arm 220 will cause the brackets 204 and 206 to rotate about the pivot shaft 208. In this position, the underweights will be transferred to the underweight conveyor 118 by passing over the reject conveyor 110, which now assumes the position illustrated in dot-dash lines in FIG. 7.

The reject conveyor 110 will remain in this position until the proper weight is registered by the scale 108. When this occurs, the crank shaft 234 will be actuated once again to thereby rotate the crank arm 232 and project the crank arm 220 such that the reject conveyor 110 returns to its original position. At such time, it will resume transfer of the proper weight of stacked material from the weigh conveyor 104 onto the correct and overweight conveyor 112.

Correct and Overweight Conveyor

The proper weight stacks are transferred onto the correct and overweight conveyor 112, which essentially is of the chain type which includes a number of chains 240 mounted at both the leading and trailing ends on a corresponding number of pulleys 242. The pulleys 242 of the trailing end are suitably keyed to and properly spaced on shaft 244 extending between the plates 132 and 134 with its ends suitably journalled therein. As will become apparent shortly, this shaft 244 is secured to take-off drive 114 which is coupled with the main drive 102.

Underweight Conveyor

When a package of sliced product on the weigh conveyor 104 is encountered by scale 108 of underweight proportions, it is transferred onto the underweight conveyor 118. The underweight conveyor is similarly of the chain type including a plurality of chains 250 mounted at their respective ends on a corresponding number of pulleys 252. The pulleys 252 at the leading end of the underweight conveyor 118 are keyed to shaft 254 and properly located thereon. This shaft 254 is also coupled with the take-off drive 114 which, in turn, is interconnected with the main drive 102. As shown, a directional change may be utilized for purposes of facilitating the correction of underweights by providing for a 90° change in the path of travel of such stacks.

Main and Take-Off Drive

When a proper slice count has been made and the corresponding number of slices accumulated on the set of stacker arms 148, means will be actuated to thereby rotate the turret shaft 140 and cause the stack to be transferred onto the weigh conveyor 104. The drive for this means of actuation of the turret shaft 140 is conveniently taken off the main drive 102. With this in mind, and referring first to the main drive, it will be observed that a conventional A.C. motor 260 has its output shaft coupled with the usual reduction gear box 262, the output of which is taken off by shaft 264. A gear 266 is keyed to the shaft 264 and is suitably retained thereon by means of a collar 268.

Turning now to the take-off drive 114, which constantly imparts movement to both the underweight conveyor 118 and correct and overweight conveyor 112, gear 270 meshes with gear 266 in directly connecting the respective drives. A belt pulley 272 is suitably secured to the gear 270 by means of a series of anchoring bolts 274. Both gear 270 and pulley 272 are freely rotatable upon sleeve 276, as for example, by interposed bearings, with this sleeve 276 mounted concentrically on shaft 234. A belt 278 is disposed on pulley 272 and takes off its drive and transfers it to pulleys 280 and 282 which are on the shaft 244 of the correct and overweight conveyor 112 and shaft 254 of the underweight conveyor 118, respectively. An adjustable idler pulley 284 is advantageously located on plate 132 in a well-known manner such that it will function to take up any undesirable slack in the belt 278.

The stacker 100 obtains its timed intermittent drive from the A.C. motor drive 102; and in this connection, a gear 290 meshes with gear 266 of the drive shaft 264. This gear 290 is rotatable on the turret shaft 140, as for example, by an interposed bearing, and is anchored to the frame of the clutch 292. The clutch 292 is of the electrical type consisting of a field, rotor and armature and may be of a commercially available variety and design. For purposes of the present embodiment, the rotor of the clutch 292 may be fixed to the shaft 140 and its armature fixed with respect to the gear 290. When the field is energized, it causes the clutch plate surface on the rotor to contact the opposed faces of the armature and, consequently, permit the turret shaft 140 to rotate. Under such circumstances, the turret shaft will preferably rotate 90° according to the disclosed embodiment of this invention.

When speed of rotation is relatively high, as is the present case, bearing in mind that inertia cannot be overlooked, a brake 296 is usually required. In such a case, the brake prevents extreme action of the clutch 292 upon rotation such that the clutch mechanism will not be damaged, even if considerable force accompanies the rotation. The brake should be quick acting so that rotation of the turret shaft 140 will cease within prescribed limits and should automatically release at the instant of clutch re-engagement. The brake may also be of the electrical type containing a field, rotor and armature of an order that is commercially available. In the present instance, the brake rotor is fixed to the clutch frame which, in turn, is secured to the plate 134 while the brake armature is fixed to the shaft 140. Thus, when the field is energized, the rotor and armature contact, and, consequently, brake.

Figure 8:
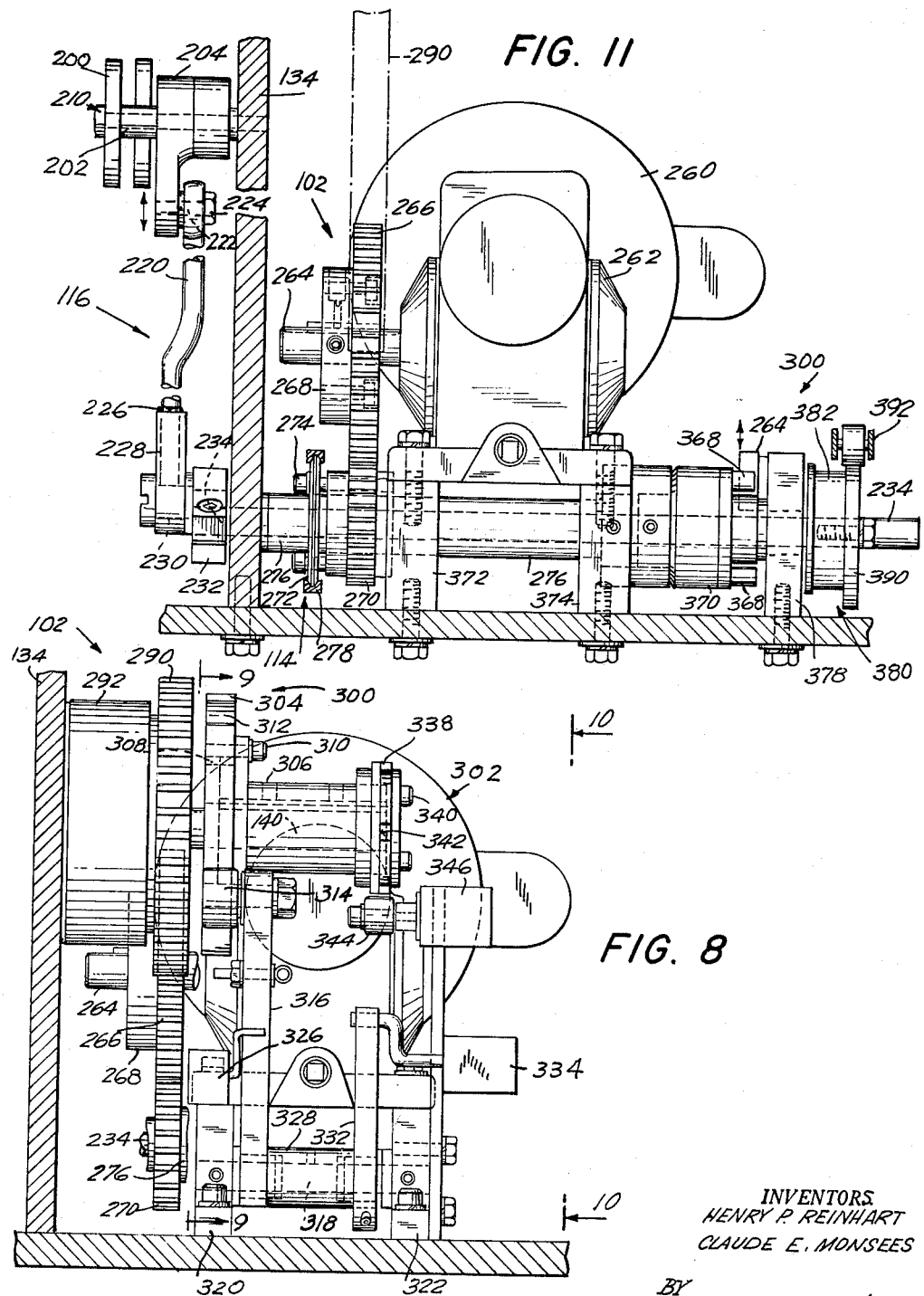
FIG. 8 is a rear elevational view of the detent and pin cam assemblies shown associated with the clutch on the turret shaft and taken substantially along the line 8—8 of FIG. 6.

A detent cam and switch assembly 300 (see FIGS. 8 and 9) and pin cam and switch assembly 302 (see FIGS. 8 and 10) cooperate in controlling the operation of both the clutch 292 and brake 296. With specific reference to the detent cam and switch assembly 300, it will be noted that a detent cam 304 is keyed to the turret shaft 140 through an interposed collar 306. The collar 306 is keyed directly to the turret shaft 140 and includes a series of slots 308 in which adjusting screws 310 are adapted to be projected for purposes of adjusting the relative position between the detent cam 304 and the turret shaft 140. In this connection, the present embodiment contemplates a four-pocket turret 100 and, consequently, a cam 304 having four detents 312 spaced at 90° intervals along its circumferentially extending periphery. A cam follower 314 is adapted to follow the periphery of the cam 304 and be disposed in a detent 312. In this connection, the follower 314 includes an arm 316 pivotally mounted on a shaft 318 which is supported by a pair of brackets 320 and 322. The engagement of the follower 314 with the periphery of the cam 304 is assured by a biasing means which includes a spring 324 interposed between the arm 316 and the frame of the gear box 262. As will be more fully understood shortly, when the follower 314 rides out of its associated detent 312, the arm 316 will shift the arm of a limit switch 326, which may be one of many commercially available, thus de-energizing the clutch 292.

The arm 316 is fixed to a collar 328, both of which are disposed on shaft 318 extending between brackets 320 and 322. The other end of the collar 328 is fixed to another arm 332, which consequently, oscillates with arm 316. This arm 332 is adapted to engage the arm of a second limit switch 334 and open it for purposes of momentarily de-energizing a relay, as will more fully be explored later.

Figure 9:
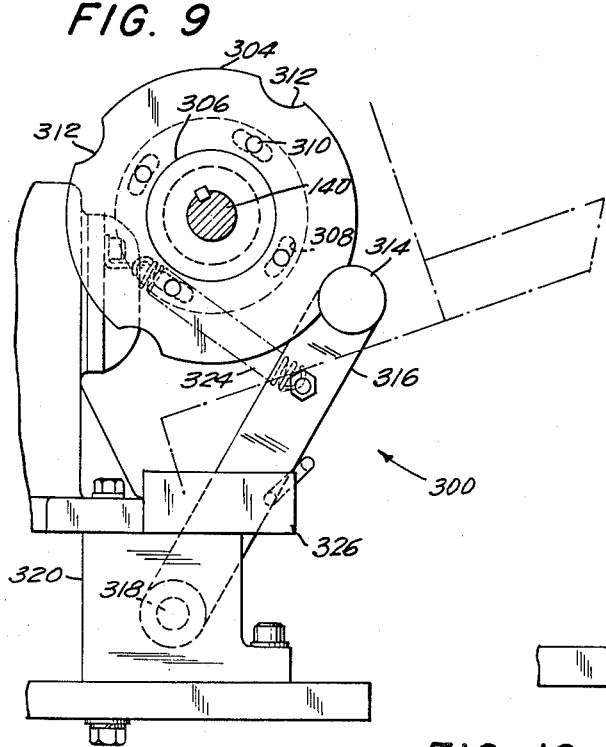
FIG. 9 is a side elevational view of the detent cam assembly when viewed along the line 9—9 of FIG. 8.
Figure 10:
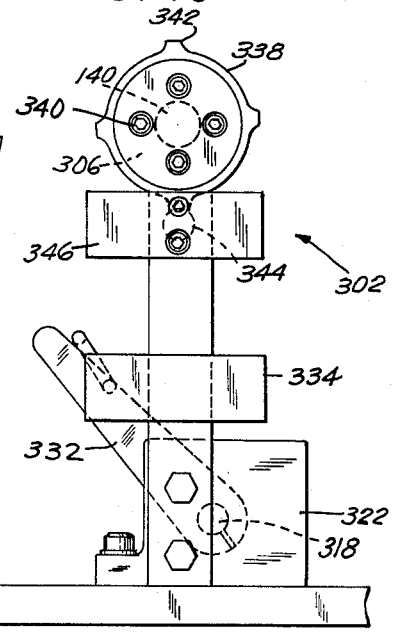
FIG. 10 is similarly an elevational view of the pin cam assembly when viewed along the line 10—10 of FIG. 8.
Figure 16:
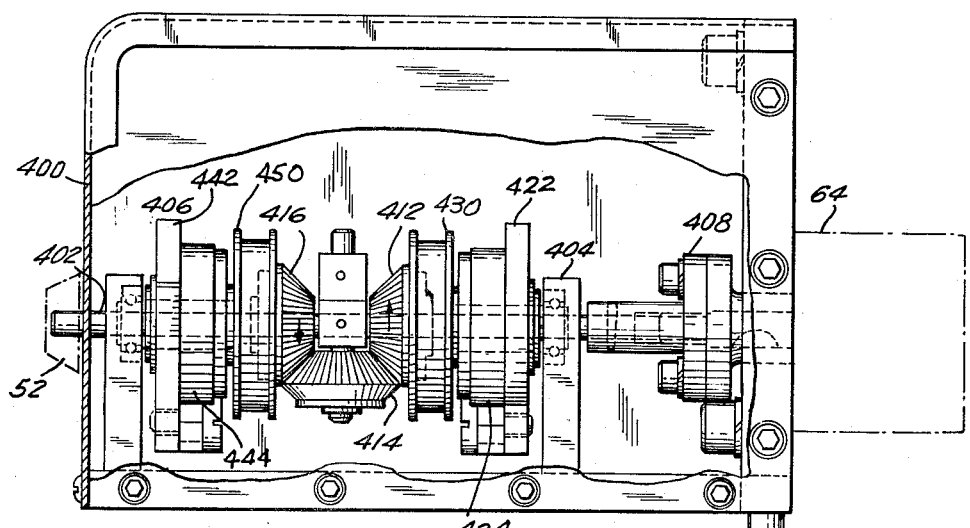
FIG. 16 is a side elevational view with certain parts broken away and removed of the corrector assembly.
Figure 12:
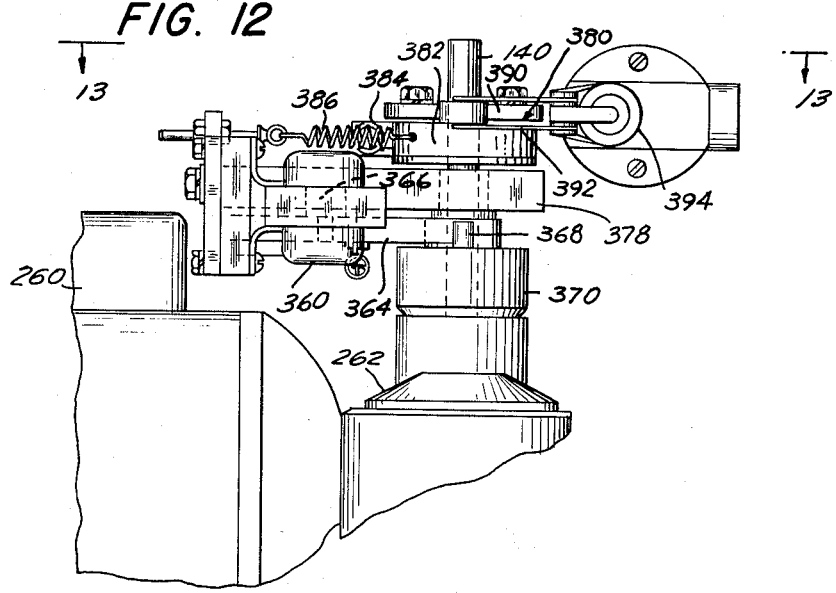
FIG. 12 is an enlarged fragmentary plan view of the drive assembly and controls thereof for the weigher.
Figure 13:
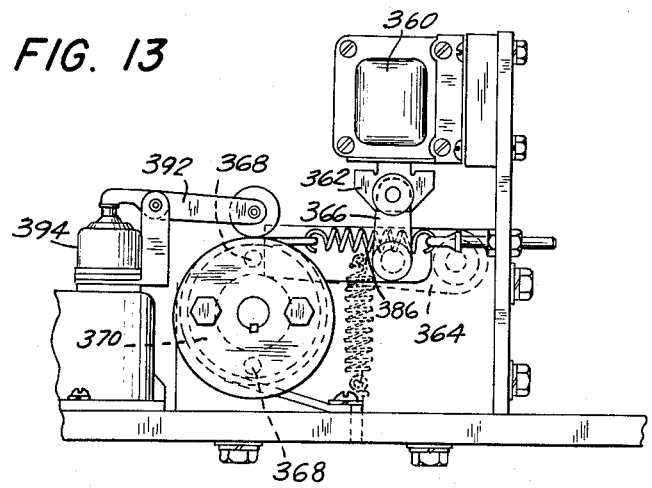
FIG. 13 is a side elevational view of the drive assembly of the weigher and controls therefor viewed along the line 13—13 of FIG. 12.

Referring now to the pin cam and switch assembly 302, it will be noted that cam 338 is secured to the collar 306 by means of a suitable number of bolts 340. In this manner, the cam 338 will rotate with carriage shaft 140 which is, in turn, keyed to the collar 306, as previously described. The cam 338 includes along its periphery rises 342 at 90° intervals along its circumference and out of phase with respect to the disposition of the detents 312 of the cam 304. This will be evident by a more visual comparison of such cams, as they are illustrated in FIGS. 9 and 10. The rises 342 along the periphery of cam 338 are adapted to actuate a roller 344 such that a still further limit switch 346 will close. A relay will, accordingly, energize a relay which will initiate the actuation of the brake 296, thusly stopping the turret 100. Under such circumstances, both the detent cam 304 and pin cam 338 will stop their rotation, thereby permitting the follower 314 to fall in the next detent 312 on the periphery of the cam 304. The relay de-energized by the operation of the switch 334 is only de-energized momentarily and just for the length of time the rise 342 of the pin cam 338 is actuating switch 346. Consequently, cams 304 and 338, together with the turret 100 will rotate 90° or through one of the predetermined intervals. Therefore, the next turret pocket is exposed and placed in its slice receiving position for purposes of stacking the sliced product as it is discharged by the slicing machine 31.

Any unit of stacked slices going over the scale 108 that is underweight will cause the reject conveyor 110 to lower, thereby preventing any of such units from passing. The reject conveyor 110 is maintained in this position until a unit having the prescribed passable weight is registered by the scale 108. All of the rejected units will be delivered by the reject conveyor 110 to an operator who will correct the weights of the units to the necessary extent. Any unit going over the scale with a passable weight will then raise the reject conveyor 110, thereby delivering the unit to the conveyor 112 which will lead the properly measured stacked slices to the various packaging stations.

When an underweight stack of sliced products passes over the scale 108, a signal is produced which results in the energization of a reject solenoid 360 which raises its core piece 362 connected with a pivotal pall 364 by means of a link 366. Thus, the pall 364 will rotate about its pivot to thereby free it from the stop 368, two of which project, 180° apart, from the casing of a slip clutch 370. In this connection, the clutch 370 has its operating parts interposed between the crank shaft 234 and a sleeve 276, rotatably mounted on and concentric with the shaft 234, as well as being directly connected with the gear 270 which rotates constantly off the main drive gear 266. As will be appreciated, the sleeve 276 is journalled in a pair of spaced brackets 372 and 374, substantially as shown. Thus, when the pall 264 is raised, the slip clutch 370 will serve to connect the crank shaft 234 and sleeve 276 to cause the crank shaft to rotate with the sleeve 276 and, consequently, the driven gear 270. Thus, the crank 116 will be actuated to lower the reject conveyor 110.

It should be understood, however, that as long as underweights pass over scale 108, the reject conveyor will remain in a lowered position. Under such circumstances, the free end of the crank shaft 234 is suitably journalled in an upstanding bracket 378 and has mounted thereon a brake 380 which consists essentially of a wheel 382 on the crank shaft 234 and a strip of sheet material 384 which bears against the outer periphery of the wheel 382 with a pressure that is adjustable by increasing or decreasing the bias exerted by the spring 386. A cam 390 is suitably keyed to the free end of the crank shaft 234 and has a suitable configuration, whereby the arm 392 of a limit switch 394 may serve as a cam follower for purposes of closing the switch. The reject solenoid 360 will, accordingly, be de-energized after it permits the engagement of the clutch 370. Under such circumstances, the pall 364 will return to its original position at which time it will engage the next stop 368 for purposes of preventing further rotation of the sleeve 276 with the crank shaft 234. Thus, the crank 116 will remain rather stationary through the cooperation of the clutch 370 and brake 380.

When a package of stacked, sliced products passes over the scale 108 of either correct or overweight, the reject solenoid 360 will once again become energized, as will become apparent shortly in connection with a detailed description of the electrical circuits involved, to repeat the aforementioned operation whereby the crank 116 will return the reject conveyor 110 to its original position, thereby permitting the correct or overweight packages to be transferred onto the correct and overweight conveyor 112. As will be appreciated, when this occurs, the clutch 370 will become engaged, thusly enabling the sleeve 276 to rotate 180° before the pall 264 is lowered to engage the following stop 368, following the de-energization of the reject solenoid 360 by the actuation of the limit switch 394. If the packages are, however, otherwise underweight, the reject solenoid 360 will not become energized when the reject conveyor 110 is in its lowered position. The means for accomplishing this will be described in connection with an explanation of the electronic circuits.

Feed Control Corrector

As mentioned in the above, in connection with the description of the hydraulic circuitry of the slicing machine 31, the control valve 64 includes an orifice through which fluid passes or flows. The size of this opening determines the rate at which the pusher 35 feeds the loaf 34 into the slicing blade 36. Further, the size of this opening is controlled by the corrector 52 which is responsive to signals received from the scale 108 as to whether the stack of sliced products coming from the slicing machine are either underweight or overweight. In practice, permissible limits are employed around the prescribed weight for the stack before a correction is made. The corrector 52 is mounted on the table 32 of the slicing machine 31 adjacent the flow control valve 64 and is encased in a housing 400 having suitable means for providing access to its interior. The corrector 52 includes within the casing 400, a centrally disposed shaft 402, which is coupled directly with the control valve 64 for purposes of regulating the size of its orifice. The shaft 402 is journaled in a pair of brackets 404 and 406 with one end extending through the collar 408, which is suitably anchored to the housing 400 and into the control valve 404. The other end of the shaft 402 projects out through the housing 400 and mounts a dial 52 which serves as a manual adjustment for the orifice opening of the control valve 64. At the intermediate sector of the shaft 402, mating, beveled gears 412, 414 and 416 are suitably keyed thereto. Gear 412 may be considered to be on the increase side of the corrector 52, in that, it is actuated in a rotational direction that will, in effect, increase the orifice of the control valve 64, thereby increasing the rate of feed of the pusher 35 to correspondingly increase the slice thickness. As will be appreciated shortly, this is accomplished in increments, whereby the change in the size of the orifice of the control valve 64 is not accomplished instantaneously. The reason for this being that pockets or voids, as well as zones of less density, may be encountered in the loaf being sliced and stacked; and consequently, the signal to correct may be false, thereby making it more desirable to change the orifice size in increments so that it may be adjusted or returned to its original setting in a shorter period of time or thereabouts in the event that such a condition exists.

Gear 416, on the other hand, will rotate in such a direction, when actuated by a predetermined signal, that the size of the orifice opening is decreased to thereby decrease the rate of advance of the pusher 35 and, consequently, the slice thickness, in a manner similar to that described with respect to gear 412.

Referring now to the mechanism that actuates gear 412 for purposes of increasing the slice thickness, it will be noticed that a solenoid 418 is secured to a side of the housing 400 by a suitable bracket 420, and when energized, serves to elevate arm 422. This arm 422 is adapted to be raised against the bias of the spring 423 connected between the arm and the base of the housing 400. In addition, arm 422 is connected directly with a slip clutch 424 on the shaft 402 and is permitted limited movement of a predetermined magnitude by the employment of an adjustable set screw 426. The slip clutch 424 will only slip when the arm 422 lowers and not when the arm is initially raised, because of the operation of the mechanical brake which includes strap 428, partly embracing wheel 430 on the shaft 402 with an adjustable pressure, rendered so by means of the spring biasing means 432. Thus, when the solenoid 418 is energized, the bevel gear 412 will be displaced in a counterclockwise direction an integer amount, as viewed in FIG. 15. Under such circumstances, gear 414 will turn, along with the corrector shaft 402. The decrease side of the corrector 120 includes solenoid 438 suitably secured to the interior of the housing 400 by means of a bracket 440. Similarly, when energized, this solenoid 438 is adapted to raise the arm 442 an integer amount and correspondingly rotate the attached clutch 444 against the bias of the spring 443. Once again, the amount of displacement will depend upon the setting of a set screw 446. Another mechanical brake is located within the housing 400 for action on the shaft 402 and includes strap 448 on wheel 450 which, in turn, is keyed to the shaft 402. The pressure of the strap 448 against the wheel 450 is adjustable by means of the spring biasing means 452. Thus, when the solenoid 438 is energized, the slip clutch 444 is rotated by means of the arm 442 and, in this instance, will rotate or turn bevel gear 416 in a clockwise direction, as viewed in FIG. 15. The gear 414 and shaft 402 will accordingly rotate in a reverse direction to thereby decrease the flow of oil through the flow control valve 64 to slow down the rate of movement of the pusher 35 towards the slicing blade 36. It should be understood that the stroke of arm 442 is less than that of arm 422 because of the desirability of permitting overweights, as a rule, to pass through; whereas, the reverse approach is taken with respect to underweights, in that it is desired to correct this situation as soon as possible in an orderly, systematic manner.

Scale

Reference is now made to the scale 108 which is well known to the art and may be obtained commercially from the manufacturer Wright Machinery Company, Division Sperry Rand Corporation, of Durham, North Carolina, under the name Wrightonic Checkweigher. However, it should be understood that the scale 108 does not per se constitute part of the present invention; and any one of the several commercially available scales may serve equally as well. The illustrated scale 108 may be of the parallelogram type having a main base 460 possessing this configuration disposed within the scale cabinet 126 and accessible through the door 128. A pair of flexible plates 462 and 464 are suitably coupled at one end to the main base with the free ends of such plates freely suspending the weigh head 466 which serves to clamp the support shaft 170 of the scale conveyor 104 to the scale 108, thereby rendering the scale responsive to weight placed on the scale conveyor 104. The flexible plates 462 and 464 serve to additionally suspend a suitable damper 468 operable in the usual manner, as well as the core piece 470 of the differential transformer 472. The windings 474 of the differential transformer are suitably fixed to the main base 460. The core piece 470 is adjustable in its mounting bracket by means of a long thread 476 and properly placed jam nuts 478. The reason for this adjustment being that different tare weights of scale conveyors 104 may be encountered as well as electrical centers for the differential transformer 472.

Control Circuitry

Figure 17:
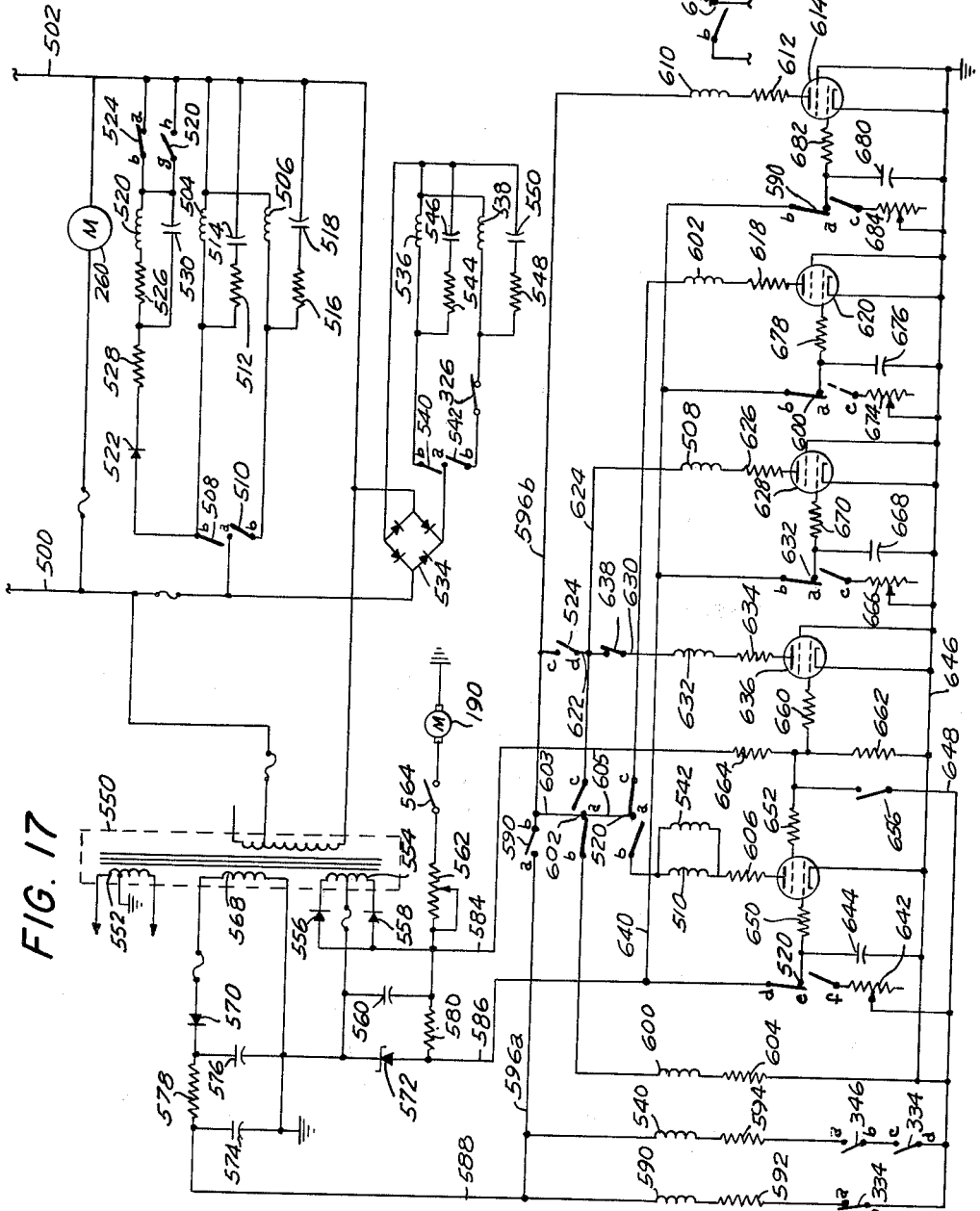
FIG. 17 is a circuit diagram of the control circuit employed in the present invention.

Referring now to the control circuitry illustrated in FIG. 17 for interlocking the operation of slicing machine 31 and starter 100, the required amount of electrical energy, in the form of A.C. current, is supplied by power lines 500 and 502 which, in turn, may be controlled by a master switch (not shown). The drive motor 260, which turns the turret as well as the driven conveyors, may be conveniently connected across these lines. In addition, the start coil 504 and stop coil 506 of double solenoid valve 54 extend between these lines and are respectively series connected with normally open switch contacts 508a and 508b and contacts 510a and 510b of relays 508 and 510, respectively. Resistor 512 and capacitor 514 are series connected across start coil 504; and this circuit serves to prevent or squelch arcing across the contact terminals 508a and 508b. A similar function is performed by resistors 516 and capacitor 518 with respect to the arcing potential of contact terminals 510a and 510b.

A relay 520 is connected across the power lines 500 and 502 in series with normally open switch contact terminals 508a and 508b. A diode 522 is interposed in the line between the relay 520 and terminal 508b for rectifying the applied voltage across the relay. A limit switch 524 electrically connects the relay 520 with line 502; and is advantageously located on the bed 33 of slicing machine 31 (see FIG. 1) whereby it is adapted to close upon engagement with the loaf 34 of product to be sliced as it advances towards the blade 36. A pair of series resistors 526 and 528 are connected in the line between the relay 520 and diode 522. Resistor 526 functions to reduce voltage and, by the same token, resistor 528 is a load resistor used to buff out the voltage of the solenoid coil of relay 520 when the limit switch 524 is open. A capacitor 530 has its positive side connected at the juncture of resistors 526 and 528 and serves as a filter with its other side connected to terminal contact 520a which is one of the pair that also includes contact 520b, as shown, which contacts close when relay 520 is energized. A jumper wire couples the juncture between capacitor 530 and contact 520a and juncture of relay 520 and limit switch 524 for purposes of facilitating the filtering action.

A diode bridge rectifier 534 is additionally connected across power lines 500 and 502 to provide rectified voltage for the coils 536 and 538 of the brake 296 and clutch 292, respectively. The brake is connected in series with the normally open contact terminals 540a and 540b of relay 540, whereas the clutch is series connected with normally open contact terminals 542a and 542b of relay 542 as well as the previously described limit switch 326. A resistor 544 and capacitor 546 are in parallel relationship with the brake coil 536 to prevent and squelch arcing of the contact terminals 540a and 540b. Similarly, the resistance 548 and capacitance 550 circuit across the clutch coil 538 for eliminating the arcing of contact terminals 542a and 542b.

The A.C. power source supplied by lines 500 and 502 is further tapped by a transformer 550 which supplies power directly to the remainder of the illustrated circuitry. This tansformer may have the usual multiple primary taps for the different house voltages encountered. It should be fully understood, in passing, that the leads should be suitably fused, as shown, by fuses valued at the desired amperage. The transformer 550 has three secondary windings, each of which are adapted to provide predetermined voltages to the electronic components connected thereto.

The transformer secondary winding 552 supplies the necessary heater voltages for the filaments of the electronic tubes, to be described shortly.

The transformer secondary winding 554 supplies the necessary voltage for the weigh belt D.C. motor 190 which continuously drives the weigh conveyor 104. This voltage is passed through a pair of diodes 556 and 558 of a diode rectifier circuit properly connected to give full wave rectification. This rectified voltage is filtered by capacitor 560, the positive side of which is connected with the suitably fused center tap of the transformer secondary winding 554. The negative line leading from this capacitor 560 extends to variable resistor 562 which is employed to vary the voltage supplied by the secondary windings 554. In this manner, the r.p.m. of motor 190, in series with the resistor 562, may be increased or decreased as desired. The motor 190 is connected to the chassis and, consequently, grounded and may be turned on and off by means of switch 564.

The transformer secondary winding 568 supplies D.C. voltage through suitably fused diode rectifier circuitry including diodes 570 and 572. The rectified voltage is filtered by capacitors 574 and 576, while the voltage, on the other hand, is reduced by the utilization of properly placed resistors 578 and 580. Thus, rectified voltage from both the transformer secondary windings 554 and 568 is adapted to be supplied across leads 584, 586 and 588.

A relay 590 is connected with lead 588 and is in series with resistor 592 and normally closed terminals 334a and 334b of limit switch 334. Resistor 592 serves to reduce potential across the relay 590. Relay 540 is in parallel relationship with relay 590 and is similarly connected in series with a voltage reducing resistor 594 on one side; whereas, on the other, it is electrically extended from branch wire 596a spliced with lead 588. Normally, open contact terminals 346a and 346b of limit switch 346 and terminals 334c and 334d of limit switch 334 are likewise in series with relay 540.

A relay 600 similarly extends from wire 596b across relays 540 and 590, but includes normally closed terminal contacts 602a and 602b of relay 602. A jumper wire 603 extends from the juncture of these contact terminals and companion terminals 602a and 602c to branch wire 596b which has interposed contact terminals 590a and 590b which are ordinarily open, as shown. Resistor 604 serves the usual purpose of reducing voltage supplies to relay 600.

Another jumper wire 605 extends from the juncture of normally closed terminals 602a and 602b with normally open terminals 602a and 602c to the juncture of normally open terminals 520a and 520b with normally closed terminals 520a and 520c of relay 520. Relay 510 is connected with terminal 520b and has coupled in parallel therewith relay 542. These relays have the voltage applied thereto reduced by means of resistor 606 which is connected to the plate terminal of tube 608.

The branch wire 596b is connected directly with a terminal of relay 610. A voltage reducing resistor 612 is connected across the other relay terminal as well as the plate terminal of tube 614.

Relay 602 is connected to terminal 520c and in series with voltage reducing resistor 618 together with the plate terminal of tube 620.

It will be observed that a jumper wire 622 extends between branch wire 596b and lead 624 which, in turn, extends between terminal 602c and one terminal of the relay 508. This jumper wire contains the contact terminals 524c and 524d of previously described switch 524 which is adapted to be actuated to close these switch terminals upon the proper disposition of a loaf 34 to be sliced on feed bed 33. Series resistor 626 functions to reduce voltage and extends between the other terminal of relay 508 and the plate terminal of a tube 628.

A further jumper wire 630 extends from the junction of wire 622 and lead 624 to one of the terminals of relay 632. The other relay terminal is joined with a voltage reducing resistor 634 which, in turn, couples with the plate terminal of tube 636. Wire 630 contains a normally closed manual switch 638.

The line 586 cooperates in servicing the slice count timer together with the first slice, space and read timers which will be fully explored shortly. This line 586 leads directly to the slice count timer, with branch line 640 extending to the other timers.

The slice count timer is properly, electrically connected such that it will in time cause tube 608 to fire and, consequently, energize relays 510 and 542. To this end, the timer includes the variable resistor 642 and capacitor 644. The capacitor 644 is connected across line 646 and the junction terminal 520e of relay 520. In this connection, terminal 520e forms a normally closed switch with contact terminal 520d and open contact with terminal 520f. This terminal 520f is conected to one side of variable resistor 640, the other side of which extends to lead 648. A resistor 650 goes to the grid of tube 608 whereas resistor 652 is connected to the tube screen; and under such circumstances, these resistors serve to reduce the initial voltage applied to the corresponding grid and screen. As will be appreciated, the tube 608 will accordingly not conduct with this bias placed thereon. The bias on the grid is removed after a preset bias interval depending on the adjustment of variable resistor 642. This time interval is synchronized with the blade rotation such that a certain number of slices will be discharged by the slicing machine 31 for purposes of constituting a particular stack. It will be understood that the capacitor 644 will become charged initially due to the closed contact terminals 520e and 520d. When these terminals open and contacts 520e and 520f closed, in a manner to be eventually described, the resistors 650 and 652 will be connected and the capacitor shorted. Under such circumstances, the bias voltage will be removed from the grid of the tube 608. Obviously, the more the resistance afforded, particularly through the adjustment of variable resistor 642, the longer will be the time necessary to reduce the voltage to zero.

A synchronization switch 656 extends from one side of the resistor 652 to line 548 and serves to assure a full last slice of proper thickness. The juncture of synchronization switch 656 and resistor 652 is connected with line 584 which extends to line 646. This switch 656 is adjustably mounted on the back end of the drive shaft 40 for the slicing blade 36. For a detailed description of switches usable with this invention in such capacity, reference should be made to commonly assigned U.S. patent application SN 839,199, filed September 10, 1959, now Patent No. 3,027,924 granted on April 3, 1962, and U.S. Patent No. 2,812,792. The synchronization switch 656 is ordinarily open, but closes on every complete turn of the blade 36 for purposes of reducing the screen voltage on the tube 608. When this occurs, the tube 608 will conduct to thereby initiate actuation of the relays 510 and 542.

The tube 636 conducts in order to energize relay 632 and will have its grid connected with the lead 584, as shown. Resistors 660, 662 and 664 function to reduce the initial voltage applied to the grid of tube 636, with both tube screen and cathode extending to the line 646.

A first slice timer circuit including variable resistor 666 and capacitor 668 regulate the firing of tube 628 which is adapted to energize relay 508 for the purpose of obtaining a full first slice upon reinitiation of the feeder 35 to resume the slicing operation following the deposit of a stack of predetermined number of slices of the prescribed weight and preset time interval for carrying the stack away. The resistor 670 will effectively reduce the initial voltage applied to the grid of tube 628 which has both its screen and cathode connected with line 646. Once again, the capacitor 668 will initially become charged through the normally closed contact terminals 632a and 632b which are coupled with lead 640. When the relay 632, however, is energized, contact terminals 632a and 632b will open; whereas, terminals 632a and 632c will close, thereby permitting the bias voltage to drain from the tube grid through variable resistor 666. Accordingly, the more resistance afforded by the variable resistor 666, the more time it will take to discharge the capacitor 668. Thus, upon the complete discharge of the bias voltage on tube 628, it will conduct to energize relay 508. This time delay can be regulated to assure a full first slice by synchronization with the speed of rotation of the blade 36.

A space timer circuit is similarly formed with a variable resistor 674 and capacitor 676. This circuit provides a sufficient time delay between the stopping and restarting of the feeder 35 of the slicing machine 31 so that an adequate, yet commercially practical, interval is present between stacks. In this connection, a resistor 678 serves to reduce voltage initially applied to the grid of tube 620 which, in turn, is adapted to actuate relay 602 when permitted to fire. The tube screen and cathode are both connected directly to line 646. Upon charging capacitor 676 through normally closed contact terminals 600a and 600b, a bias voltage will be held on the grid of tube 620. The extent of space between stacks will, accordingly, be a function of the adjustment of the variable resistor 674. This will, obviously, determine the time it will take to fully discharge the capacitor 676 upon the opening of terminals 600a and 600b and simultaneous closing of terminals 600a and 600c upon energization of relay 600.

When the bias on tube 620 no longer exists, it will conduct to energize relay 602.

The read-out timer serves to delay the operation of the scale 108 and, consequently, registration of stack weights until such time as there is an unweighed stack and only one of sliced product present on the weigh conveyor 104. Under such circumstances, erroneous reading will not be picked up by the feed back means translated and sent back to the corrector 120 to correct the setting of the control valve 64 and rate of travel of pusher 35. Therefore, the scale 108 will be released for weighing upon the energization of relay 610 as a result of the discharge of tube 614 which would have a bias previously placed thereon by capacitor 680 acting through resistor 682 which reduces the initial voltage supplied to the tube grid. The read timer is completed by employment of the usual adjustable resistor 684, the adjustment of which will determine the time within which the capacitor 680 will drain to thereby remove the bias from the tube grid. As will be fully explained below, the relay 590 is only temporarily de-energized following deposit of stack of slices by stacker 100 thereby permitting the capacitor 680 to charge through the terminals 590a and 590b of this relay. As soon as the relay returns to its energized state, these terminals will open with the capacitor 680 permitted to discharge across the now closed relay terminals 590a and 590c through variable resistor 684. The setting of the resistor 684 will be such as to establish the desired time delay, mentioned in the above, before the tube 614 can conduct to energize relay 610.

Summarizing the operation of the control circuit, it will be realized that in the first instance, a loaf 34 of premolded product is placed on the bed 33 of the slicing machine 31. By means of rapid traverse lever 51, the loaf 34 is advanced towards the slicer blade 36 by pusher 35 through the illustrated vacuum gripper. As the loaf 34 approaches the proximity of the blade 36, it is advisable to release this handle. Eventually, the loaf 34 will engage the limit 524, thereby permitting current to flow through it to relay 520, as a result of the simultaneous energization of relay 508 and of its closing contacts 508a and 508b. Contacts 520g and 520h will, consequently, close together with contacts 520a and 520b. The latter will thusly provide a path for current to the coil of relay 510 and 542. When relay 520 is energized, its contacts 520d and 520e will open after capacitor 644 charged and, at the same time, close contacts 520e and 520f. Thus, the slice count timer will be set into operation with the resistor 642 bleeding the voltage off capacitor 644 to relieve the bias on the grid of tube 608. When the voltage reads zero, current can flow past this grid. Similarly, when the synchronization switch 656 closes, which occurs with each revolution of the slicer blade 36, the bias will be removed from the screen of this tube 608, thereby permitting tube 608 to conduct. In this connection, the closing of switch 656 is synchronized with the position of blade 36 so that a full last slice is assured. Relays 510 and 542 will, consequently, be energized upon the firing of tube 508.

Accordingly, contacts 510a and 510b will close allowing current to flow to the stop coil 506 of the double solenoid valve 54 to momentarily stop the advance of the feeder 35 of the slicing machine 31. Contacts 542a and 542b close at the same time upon energization of relay 542. Current will now be permitted to flow to the coil 538 of the clutch 292. As a result, the turret stacker 100, together with the commonly mounted detent cam 304 and pin cam 338 will rotate a certain amount, which in the instant embodiment represents about a quarter turn.

When the cam follower 314 rides out of the associated detent 312 of detent cam 304, the arm 316 will shift thereby opening limit switch 326. The arm 332 will pivot with arm 304 to simultaneously open limit switch 334 and, more particularly, its contacts 334a and 334b. Accordingly, the clutch coil 538 will be de-energized along with relay 590, which is ordinarily energized. It will be recalled that limit switch 346 is closed by the cam projection 342 of pin cam 338 as the latter rotates with the turret shaft 140. Thus, current is free to flow through the coil of relay 540 following the substantially instantaneous closing of contacts 334c and 334d. The energization of this relay 540 results in the closure of its contacts 540a and 540b and, therefore, energization of brake coil 536 and actuation of the brake 296. The turret shaft 140 and, consequently, the rotation of turret 100, detent cam 304 and pin cam 538 will stop as the roller or cam follower 314 drops into its next detent 312.

When relay 590 was de-energized, which occurs only momentarily, its contacts 590a and 590b opened, thereby de-energizing relays 600, 510, 542, 632, 508, 602 and 610. In addition, contacts 590a and 590b closed momentarily to charge to read out condenser 680. As soon as relay 590 energized, its contacts 590a and 590b closed again together with contacts 590a and 590c. The read-out timer then started with the bias voltage or the grid of tube 614, as created by charge of capacitor 680, being drained through variable resistor 684. When the bias voltage has been completely removed, the tube 614 will conduct and, consequently, energize relay 610. The contacts 610a and 610c of this relay will open to eventually permit the scale 108 to register the weight of the stack on weigh conveyor 104.

Current will also flow from 590b through line 602 and terminal contacts 602a and 602b, thereby energizing relay 600. Accordingly, the space timer will be set into operation as the charge of capacitor 676 drains through the presently closed contacts 600a and 600c and variable resistor 674, bearing in mind that capacitor 676 charged through contacts 600a and 600b when relay 600 was momentarily de-energized. It should be apparent that the interval between stack slices is determined by the adjustment of the resistor 674. When the preset time delay has elapsed, the bias on tube 620 will be removed so that it will conduct and permit the energization of relay 602. Contacts 602a and 602b will now open to cause de-energization of relay 600 with the result that contacts 600a and 600b will close, charging the space time capacitor 676.

When relay 602 energized, current passed across contacts 602a and 602c to relay 508, as well as to manual switch 638 located on the control panel relay 632. Relay 508 will energize when tube 628 can conduct which occurs when the first slice timer has run out and, consequent removal of the bias on the tube grid. In this connection, relay 632 energized immediately to thereby close its contact 632a and 632c and allow drainage of the charge of capacitor 676 through properly adjusted variable resistor 666. The contacts 508a and 508b will close, thus allowing current to flow to the start coil 504 of double solenoid valve 54 and relay 520.

When relay 520 energizes, current will be permitted to flow through its contacts 520a and 520b to relays 510 and 542. Contacts 520d and 520e closed when relay 520 was de-energized, to thereby charge the condenser 644, of the slice count timer. Now that relay 520 is energized, contacts 520d and 520e are open while contacts 520e and 520f are closed, thus turning on the slice count timer. Slices of the product 34 are now being deposited on the turret stacker 100.

When the charge of capacitor 644 has been completely drained and the blade 36 has finished cutting the slice it has started, thereby closing the synchronization switch 656, the tube 608 will fire to energize relays 510 and 542. Consequently, contacts 510a and 510b will close to permit current to flow through the stop coil 506 of the double solenoid valve 54. The feeder 35 will, accordingly, stop, and product 34 will not be fed into the slicing blade 36.

Upon energization of relay 548, its contacts 542a and 542b close to pass current through limit switch 326 to the clutch coil 538.

When relay 510 became energized, contacts 508a and 508b opened substantially simultaneously and resulted in the de-energization of relay 520. Thus, contacts 520a and 520c, together with 520d and 520e close. Upon removal of the voltage bias on tube 620 by the charge of capacitor 676 of the space time draining through variable resistor 674, tube 620 will conduct to energize relay 602. While this is happening, the slice count condenser 644 is charging through contacts 520d and 520e. Since relay 602 is now energized, its contacts 602a and 602b are open resulting in the de-energization of relay 600. Contacts 602a and 602c closed when relay 602 was energized, thus permitting current to flow through relay 508 and relay 632 by way of switch 638, bearing in mind that terminal contacts 524c and 524d are now open since the feed of the product 34 has momentarily stopped. The first slice timer is set in operation following closure of the contacts 632a and 632c. Upon expiration of this period time, contacts 508a and 508b will close to commence the slicing and stacking operation. The cycle is repeated until the loaf 34 has been consumed.

*Weight Detector Circuit*

Figure 18:
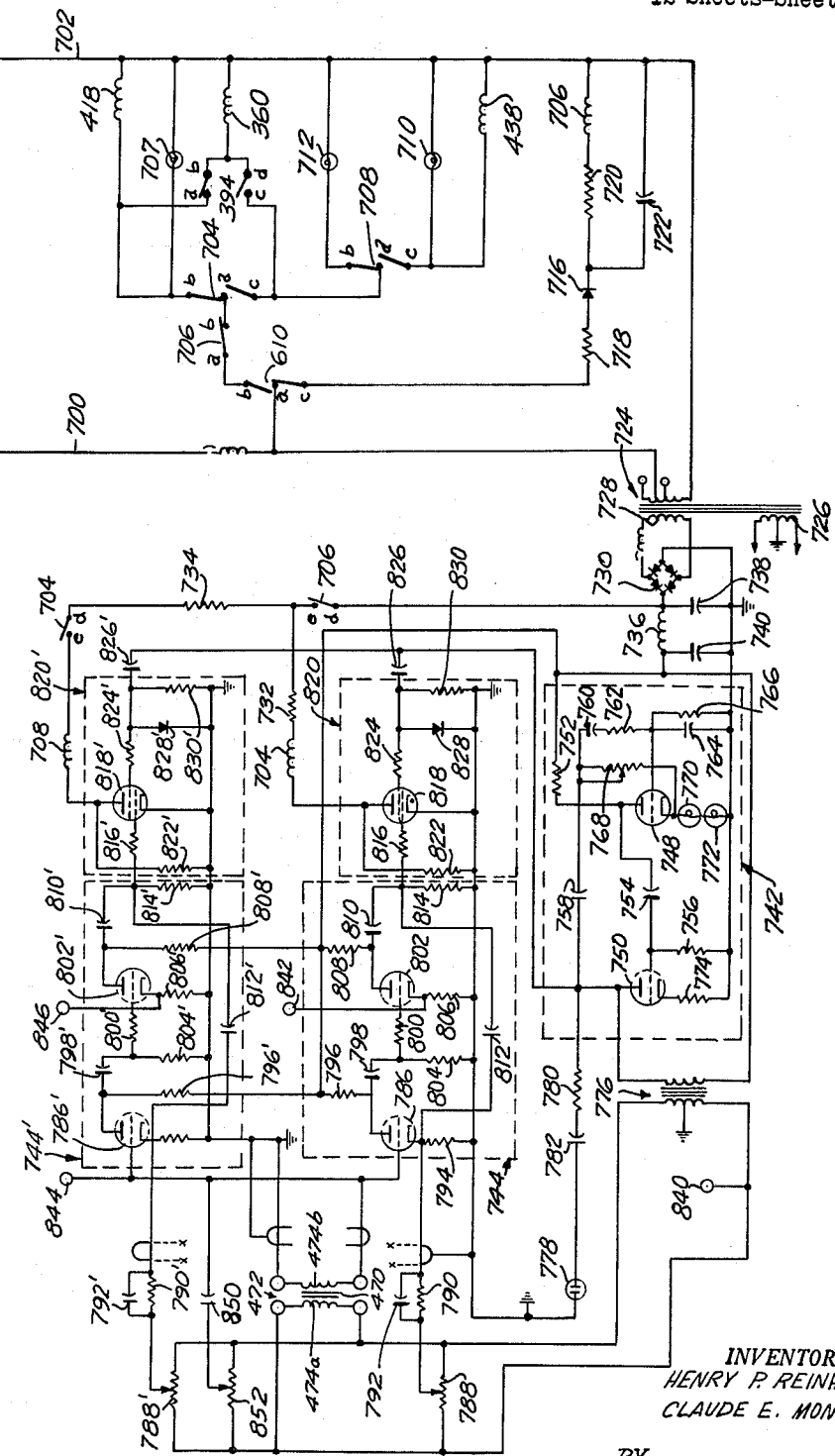
FIG. 18 is a circuit diagram of the detector circuit so employed.

Reference is now made to the weight detector circuit illustrated in FIG. 18. It should be understood that this weight detector circuit is a part of the Wrightronic Checkweigher which may be obtained commercially from the manufacturer, Wright Machinery Company Division of Sperry Rand Corporation of Durham, North Carolina, and does not constitute part of the present invention. This weight detector circuit registers the weight of the individual stacks on the weigh conveyor 104 and transmits the associated interpreted signal to the corrector 120, if necessary, and/or the drive for the crank 116 which is adapted to actuate the reject conveyor 110. Thus, a suitable A.C. electrical energy source is coupled with power lines 700 and 702 which, obviously, would be regulated by a suitable switch (not shown) and incorporates suitable fusing or circuit breaking, as is customarily done. Increase solenoid 418 or corrector 120 extends between these lines and is series connected with normally closed terminal contacts 704a and 704b of relay 704, as well as contacts 706a and 706b of relay 706 and normally open contacts 610a and 610b. A lamp 707 is connected across the solenoid 418 for purposes of indicating that the registered stack is underweight. Reject solenoid 360 is similarly series connected with the above relay switches in addition to normally closed contacts 394a and 394b of previously described limit switch 394.

The operation of reject solenoid 360 is also governed by current adapted to flow through a branch line which includes normally open contacts 394c and 394d of limit switch 394 together with similarly disposed contacts 704a and 704c of relay 704. Once again, relay switch contacts 706a and 706b and 610a and 610b control this branch line.

These contacts, along with contacts 704a and 704c are connected with decrease solenoid 438 of corrector 120 through normally open terminal contacts 708a and 708c of relay 708. Lamp 710 is in parallel with the decrease solenoid 438 and is energized, obviously, when the weight of registered stacks is overweight.

Another lamp 712 extends between the power line 702 and terminal junction 708o. This lamp is series connected with normally closed contacts 708a and 708b and will be energized when the correct weight is made.

Relay 706 is also connected across power lines 700 and 702 through normally closed, series connected contacts 610a and 610c. A diode 716 is interposed in the line and serves to rectify the applied voltage across the relay 706. A pair of resistors 718 and 720 are similarly in series with the relay 706. Resistor 718 functions to reduce voltage while resistor 720 serves as a load resistor for buffing out the voltage of the coil of relay 706 when the contacts 610a and 610c open. A capacitor 722 has its positive side connected at the juncture of diode 716 and resistor 720 and is employed as a filter.

The power lines 700 and 702 then extend across the multi-tap primary of transformer 724. The secondary winding 726 serves to apply the heating current for the various electronic tubes employed. The secondary winding 728, on the other hand, is connected through a suitably valued circuit breaker across a full wave diode rectifier 730 which is adapted to supply a direct potential to relay 704 through normally closed contacts 706c and 706d, with resistor 732 functioning to reduce voltage. This potential is additionally adapted to be applied to relay 708 upon closing of normally open contacts 704d and 704e, with resistor 734 contributing to the reduction of the applied voltage.

The direct potential is also passed through choke 736 and filtered by capacitors 738 and 740. The resultant smooth direct potential is applied to a power amplifier and oscillator circuit 742 and two-stage amplifier circuits 744 and 746. The circuit 742 is a Wien Bridge oscillator which is provided with two tubes 748 and 750, the former of which constitutes the oscillator and the latter the amplifier. The anode of the tube 748, which is fed with the regulated voltage through resistor 752, is connected through a capacitor 754 to the control grid of the tube 750, which is connected through resistor 756 to earth.

The anode of the tube 750 is, in turn, connected to the control grid of tube 748 through capacitors 758 and 760, as well as resistor 762. The control grid of the tube 748 is connected to earth through a capacitor 764 and a resistor 766 coupled in parallel therewith. The cathode of the tube 748 is connected to one side of variable resistor 768 which extends to the junction between capacitors 758 and 760. In addition, the cathode of tube 748 is grounded through series connected voltage regulator lamps 770 and 772. In this connection, the cathode of tube 750 is connected to earth through resistor 774.

The oscillatory output of the circuit 742 is applied to one end of the primary winding of step-up transformer 776, the other end of which receives the direct potential emerging from choke 736. The oscillatory output is also applied to a pilot light 778, which has one terminal earthed, after passing through resistor 780 and capacitor 782. The lamp 778 may be conveniently located on a control panel and lights up to indicate when the circuit 742 is functioning.

The secondary winding of the transformer 776 is earthed at its midpoint and is connected across the primary winding 474a of differential transformer 472. The resultant signal output from secondary winding 474b of transformer 472 is adapted to be applied to both amplifier circuits 744 and 744'. The circuit 744 provides the two-stage amplification for signals incident to underweights for the underweight side of the circuit of this figure to be ultimately sent back to the corrector 120 and, more particularly, the underweight solenoid 418, as well as the reject solenoid 360. Thus, the resultant signal traveling from the secondary windings 474b of transformer 472 is applied to the control grid of a tube 786. The tube is regulated through a variable resistor 788, the adjustment of which in effect establishes the permissible lower limit of weight for the stack of slices transferred over the weigh conveyor 104. A load resistor 790 is interposed between variable resistor 788 and the cathode terminal of tube 786, with capacitor 792 connected across resistor 790 for purposes of smoothing the voltage signals transmitted to the tube 786. This tube 786 has its cathode connected to earth through resistor 794 and has its anode connected through a resistor 796 to the choke 736, which provides it with a direct potential. In addition, tube 786 amplifies the signal coming from the transformer 472, and this amplified signal is passed through a capacitor 798 and resistor 800 to the control grid of a second tube 802.

The junction between the capacitor 798 and resistor 800 is passed to ground through resistor 804.

The second tube 802 has its cathode connected to the chassis ground through a resistor 806, which is employed to limit the amount of current that the second stage amplifier tube 802 can draw. The plate terminal of the tube 802 is series connected with resistor 808 and serves to limit the voltage applied to the plate. The second tube 802 serves to amplify the signal yet further, and this signal passes out of the circuit 744 through capacitor 810. A capacitor 812 is provided for feed back purposes with the terminal of capacitors 810 and 812 being coupled with ground through resistor 814.

The signal produced by the circuit 744 is fed through a resistor 816 to the control grid of a tube 818 in a voltage detection circuit 820. The plate terminal of the tube 818 is grounded through resistor 822, which serves to reduce voltage applied initially to the tube plate. Resistor 816 functions to supply the necessary bias to the control grid of the tube 818.

The screen of the tube 818 also receives signals, these being fed through a biasing resistor 824 and a capacitor 826 and being derived from the portion of the oscillatory output of the circuit 742. The screen of the tube 818, however, is held positive by diode 828 through a resultant applied pulsing D.C. voltage. Resistor 830 extends from the junction of capacitor 826 and diode 828 to ground, as shown.

Accordingly, a feedback path is provided from the slider arm of resistor 788 through the resistor 790-condenser 792 combination to the cathode of tube 786. At this point the path continues through condenser 812 to the function of condenser 810 and resistors 814 and 816 and then through resistor 816 to the grid of tube 818. The ampere path to this grid extends from the plate of tube 802, through the interposed condenser 810 and junction of condenser 812 and resistors 814 and 816. Under such circumstances the amplifier circuit 744 amplifies both sides of the oscillatory cycle; while the screen of the tube 818 is exposed to only one side of the cycle. Therefore, the tube 818 will conduct, when the amplified signal approaches zero potential and the screen voltage becomes zero. When the scale does not register enough weight, this tube 818 will not conduct because either the grid or the screen will serve to hold it back since one, then the other, will act accordingly at the particular frequency.

The upper limit side including two-stage amplified circuit 744', connected detector circuit 820', as well as their individual and associated components being substantially the same as that of the lower limit side, will not be described at this time, but will be accompanied by the same numerals primed. Suffice it to say for the moment that the upper limit side of this weight detection circuit will produce signals that are fed back to the decrease solenoid 438 of the corrector 120.

The various null jack check points 840, 842, 844 and 846 are convenient connections for an oscilloscope, which is adapted to show the voltage signal at the particular location.

As will be observed, a capacitor 850 is coupled with the arm of a variable resistor 852. This resistor functions to null the transformer circuitry or rather center the weight control.

In view of the foregoing, the power for the detector circuit of FIGURE 18, which incidentally illustrates the circuitry with power off, is applied by lines 700 and 702, through transformer 724 and choke 736 to the oscillator circuit 742, amplifier circuits 744 and 744', and detector circuits 820 and 820'. The oscillator tube 750 applies its generated frequency output to the step-up transformer 776, as well as pilot light 778. The output of this step-up transformer, in turn is applied to the primary winding 474a of the differential transformer 472. Amplifier circuit 744 will amplify both sides of the oscillated cycle and provides two-stage amplification of signals generated on the lower limit side and is adjustable by means of resistor 790. Tube 818 of detector circuit 820 is a thyratron and is adapted to receive on its grid the amplified frequency. The screen of tube 818 is held positive by diode 828, through a pulsing D.C. voltage; and the grid is subject to a frequency that is out of phase with the screen grid. Thus, when the core piece 470 of the scale 108 descends as a result of a stack of slices on weigh conveyor 104, the voltage output from the transformer 472 is correspondingly reduced. At a point on the decent of the core piece 470, depending upon the setting of the variable resistor 790, the voltage output is reduced sufficiently to remove the bias on both the grid and screen to permit the tube 818 to conduct to thereby energize relay 704.

The foregoing applies to the firing of tube 818' in accordance with the setting of variable resistor 788' to cause the energization of relay 708.

When the weight of a particular stack is applied to the scale 108 and the core piece 470 decends, the adjustment of the variable resistors 788 and 788' are such that relay 704 will energize first but only after the previously described read-out time for scale has run out and relay 610 subsequently energized. Under such circumstances, contacts 610a and 610c will open to cause the deenergization of relay 706 and, consequently, the closure of contacts 706c and 706d. These contacts of relay 706, obviously, must be closed before either of the relays 704 and 708 can be energized.

If the weight is great enough to cause the energization of relay 708, contacts 708a and 708c will close. Naturally, if the weight is sufficient for this, it will be enough to energize relay 704. Bearing in mind that contacts 610a and 610b are now closed due to the energization of relay 610 and contacts 706a and 706b return to their normally closed state as a result of the de-energization of relay 706, current will be permitted to flow through contacts 704a and 704c, as well as 708a and 708c. Thus, the overweight light 710 will be illuminated and the decrease solenoid of corrector 120 energized to alter the orifice opening of control valve 64 an increment to reduce the advance of the pusher 35.

If the weight of the particular stack registered by the scale 108 did not force the core 470 enough to permit the upper limit detector circuit 820' through its two-stage amplifier circuit 744' to energize relay 708 when relay 610 was energized, contacts 610a and 610c would necessarily open to de-energize relay 706 and thereby allow relay 704 to be energized through normally closed contacts 706c and 706d. Accordingly, this energization of relay 704 will enable contacts 704a and 704c to pass current to the correct light 712 through normally closed contacts 708a and 708b of relay 708.

However, if the weight of the particular stack on weigh conveyor 104 was not sufficient enough to actuate the scale 108 and, more particularly, result in the energization of relay 704, the increase solenoid 418 and associated light 707 would be energized. In this connection, upon the usual and expected energization of relay 610, current will flow through contacts 610a and 610b, normally closed contacts 706a and 706b of de-energized relay 706, and normally closed contacts 704a and 704b of relay 704. The orifice of the control valve 64 will thus be correspondingly opened an increment amount to increase the rate of advance of the pusher 35 and, consequently, loaf 34 into the blade 36 to increase the slice thickness.

It should be understood that under these circumstances, a potential will be applied across reject solenoid 360. The crank 116 will then be actuated to lower the reject conveyor 110 so that the underweight stack is transferred onto the underweight conveyor 118 from the scale conveyor 104. Furthermore, upon the actuation of reject solenoid 360, the normally closed contacts 394a and 394b will open to thusly de-energize relay 360.

Simultaneously, contacts 394c and 394d will close. As long as the stacks are underweight, the crank 116 will remain in this position at which it maintained the reject conveyor 110 in its lowered position. The formation of a stack of sliced product of prescribed weight or overweight characteristics will, naturally, at this time pass current through the reject solenoid 360 via the now closed contacts 394c and 394d. Crank 116 will once again be actuated to return or elevate the reject conveyor 110 to its original position at which it is capable of transferring both correct and overweight stacks from the scale conveyor 104 onto the conveyor 112. This recovery of the crank 116 will be accompanied by actuation of the limit switch 394 to cause contacts 394c and 394d to open, thereby de-energizing relay 360 and closing of contacts 394a and 394b. Thus, normal slicing and stacking will be resumed until underweights are encountered at which time the cycle for rejecting such stacks will be repeated.

The present invention contemplates slicing and stacking loaves of food products, some of which may be classified in the category of cold cut meats. Accordingly, the very nature of such loaves may create a problem involving friction and the absence of optimum lubricity between a loaf 34 and the feed bed 33 of the slicing machine 31. Naturally, the temperature characteristics of the loaf and properties of its constituents will determine the extent to which this may present detrimental effects and problems. In this connection, one of the more troublesome areas appear to reside during the stopping-and-then-starting stage of the slicing and stacking cycle. Thus, on a bed 33 affording a substantial degree of adhesion for the loaf 34, the latter will have a tendency to buckle, especially at its leading end, when resting on the bed 33 and when the pusher 35 is initially actuated to advance the product 34 into the blade 36. Under such circumstances, the first slice or two of a particular stack will inevitably be thicker throughout than the rest of the slices or be of non-uniform thickness.

Figure 19:
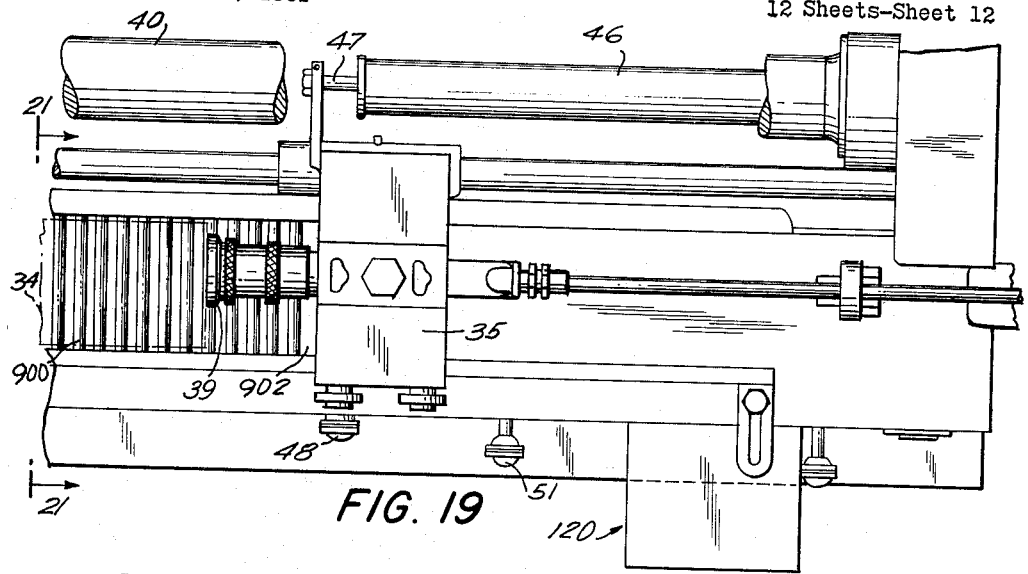
FIG. 19 is a fragmentary top plan view of the carriage and pusher of the feed mechanism for conveying a loaf of the particular food product selected along a conveyor to the slicing blade.
Figure 20:
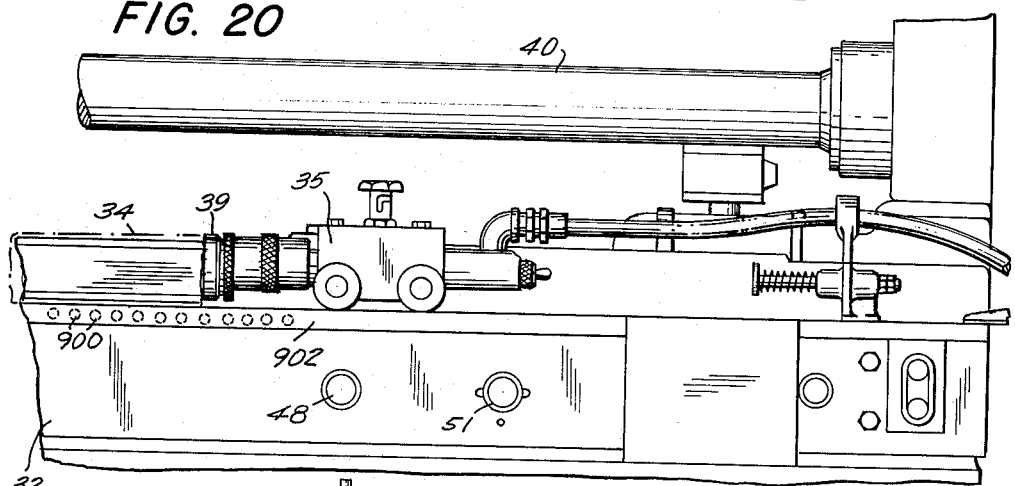
FIG. 20 is a side elevational view thereof.
Figure 21:
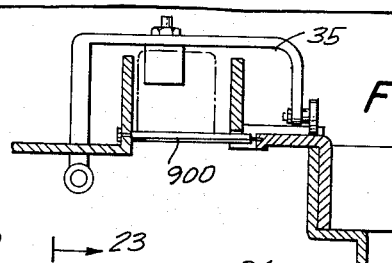
FIG. 21 is a vertical section taken along the line 21—21 of FIG. 19.

The present invention, accordingly, contemplates means for offsetting such occurrences by enhancing substantially frictionless movement of the loaf 34 to and into the blade 36 upon initiation and during actuation of pusher 35. This means may assume the form of a plurality of rolls 900 rotatably mounted on the slicing machine bed 902, shown in FIGS. 19–21, with adjustably spaced side guides together with the known vacuum gripper for the loaf 34. These rolls are preferably disposed in the expected path of travel of the product 34 and will extend along a major part of the length of such path, ending proximal the location of the slicing machine blade 36. All other structure and components may be considered the same as that heretofore disclosed and will be numbered acccordingly.

Figure 23:
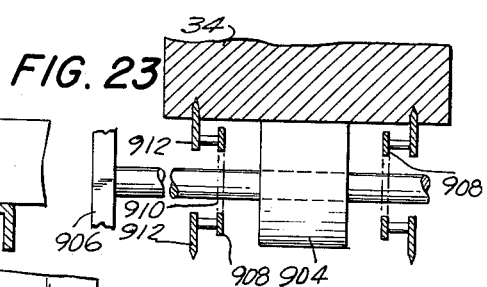
FIG. 23 is a vertical sectional view taken along the line 23—23 of FIG. 22.
Figure 22:
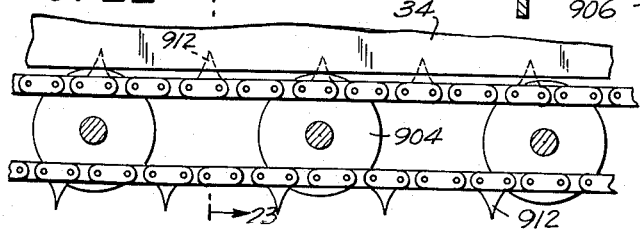
FIG. 22 is a fragmentary side elevational view in modification, of a conveyor for the loaf of food product to be driven into the slicing blade.

In FIGS. 22–23, a further embodiment of this means may constitute a series of rollers 904 rotatable on the bed 906 and interposed between a pair of chains 908, both of which may have its respective ends mounted on freely rotatable pulleys 910. The chains are constructed with a number of teeth 912 for entering and, in this manner, gripping the loaf 34 so that buckling will be minimized. The loaf 34 will, consequently, rest on rollers 904 and, at the same time, be engaged by the chain teeth 912 for a major part of the path of loaf travel while under the influence of pusher 35. Thus, any tendency for the loaf 34 to buckle is most effectively minimized, if not eliminated.

In conclusion, the operation of the apparatus for stacking and weighing sliced food products, according to invention, may be summarized as follows. The apparatus is initially set to produce a certain number of slices for a particular stack of the loaf 34 by a corresponding adjustment of the slice count resistor 642. The scale 108 is set for desired weight for the stack and the prescribed tolerance established by properly adjusting the lower limit resistor 788, as well as upper limit resistor 788'. The contemplated necessary slice thickness is translated through the setting of dial 52 for manually controlling the orifice opening for the control valve 64 and, consequently, rate of advance of pusher 35 towards the slicing blade 36. A loaf 34 is then placed on the bed 33 of the slicing machine 31, if not already accomplished, and advanced towards the blade 36 by the pusher 35. The slices thus produced by the slicing machine 31 are deposited on the turret stacker 100 until the predetermined number is attained. The control circuitry mentioned is then actuated to energize the stop coil 506 of the double solenoid valve 54 and, consequently, the forward movement of the loaf pusher 35.

Simultaneously, the stacker 100 is rotated a quarter turn through cooperative operation of the clutch 292 and brake 296 and their respective effects on turret shaft 140, as previously described. The stack of slices is, accordingly, transferred onto the constantly driven weight conveyor 104 where the stack is check-weighed by scale 108 at a time regulated by the read-out timer resistor 684. If the stack is of correct weight, it will be transferred to the correct and overweight conveyor 112 through the intermediately located reject conveyor 110. After a sufficient predetermined period of time, determined by the setting of the space time resistor 674, the slicing operation is resumed and the above cycle repeated until the loaf 34 has been consumed.

If the stack of slices is overweight, it will still be transferred to the conveyor 112 in the same manner as a stack of correct weight. However, because the permissible upper limit for the established weight tolerance will be transcended, the degree of lowering of the core 470 of transformer 472 of scale 108 will be detected as a result of the setting of the upper limit resistor 488'. A signal will thusly be produced and fed back via the weight detector circuitry to the decrease coil 438 of the corrector 120. The orifice opening of control valve 64 will be restricted a unit amount to decrease the rate of advance of the pusher 35 and, accordingly, the slice thickness. The orifice of the control valve 64 will be further adusted in increments as the formed stacks continue to be overweight until their weight is corrected and falls below the prescribed upper limit.

If the stack of slices is underweight, a signal will be produced by the weight detector circuitry at a certain stage of the decent of the core 470 of transformer 472 as determined by the adjustment of lower limit resistor 488. The signal will then be fed back to ultimately energize the reject solenoid 360 and increase coil 418 of the corrector 120. The increase coil will in effect cause the orifice opening to enlarge and advance pusher 35 to increase in increments as the underweight stacks are formed and pass over weigh conveyor 104 until the stack weights fall above the minimum parameter.

The reject solenoid 360, as explained, is only energized momentarily and serves to actuate the crank 116 to cause the reject conveyor 110 to lower and thereby deposit the underweight stacks on underweight conveyor 118. This conveyor does not elevate until a stack of slices of correct weight passes over the weigh conveyor 112 and is so registered by scale 108. When this reject solenoid 360 is energized momentarily once again, it actuates the crank 116 which raises the underweight conveyor to its original position at which it transfers stacks of slices of the proper weight onto correct and overweight conveyor 112. The slicing operation will then continue normally until one of the foregoing conditions occur at which one of the corrective measures are then automatically initiated.

Thus, the several aforenoted objects and advantages, together with the many other implicit in the above and incidental to the present invention are most effectively attained. It should be understood, however, that this invention is in no sense limited by the disclosure but is to be determined by the scope of the claims hereinafter appearing.

What we claim is:

1. For use in combination with a slicing machine having a slicing blade, a reciprocal pusher for feeding a product to be sliced into said blade, and control means for determining the rate of advance of said pusher towards said blade and consequently the slice thickness, apparatus for stacking a preselected number of slices of said product as they are discharged by said slicing machine and then transferring the stacks of sliced product that are of a prescribed weight and rejecting those stacks that are other than such prescribed weight, said apparatus comprising in combination: a stacking means to be located adjacent the discharge end of said slicing machine for receiving the slices discharged therefrom; slice counting means for determining the preselected number of slices discharged from the slicing machine; stacker actuation means coupled with both said stacking means and said slice counting means for actuating said stacking means to transfer the stack of preselected number of slices of said product and ready said stacking means for reception of another stack of slices; conveyor means in stack receiving position adjacent said stacking means and adapted to receive thereon the stacks of sliced product transferred by said stacking means; weighing means operatively connected with said conveying means such that it is adapted to register the weight of the individual stacks conveyed thereon; feedback means operatively connected with said weighing means and adapted to be coupled with said control means of said slicing machine for feeding back signals to such control means corresponding to the weight of the individual stacks over and below said prescribed weight for the preselected number of slices to thereby correct the adjustment of said control means of said slicing machine to respectively decrease and increase the rate of advance of said pusher and consequently decrease and increase respectively the slice thickness; transfer means adjacent said conveyor means for carrying away the stacks of sliced product within said prescribed weight, said transfer means including a reject conveyor adjacent said conveyor means for receiving thereon the stacks of sliced product, and a constantly driven conveyor adjacent the trailing end of said conveyor for receiving and carrying away both correct and overweight stacks of sliced product; and reject means operatively connected with said weighing means for rejecting stacks of sliced product that are underweight.

2. The invention in accordance with claim 1 wherein switch means are provided for preventing said feedback means from operating to automatically adjust the setting of said control means of said slicing machine in absence of any slice stacking.

3. The invention in accordance with claim 1, wherein first and last full slice means in synchronization with the operation of said slicing blade are provided for assuring the formation of a full first and last slice in obtaining the stack of preselected number of slices of said product.

4. The invention in accordance with claim 1, wherein said stacking means includes an intermittently rotatable unit having a plurality of slice receiving stations for purposes of accumulating at each station the preselected number of slices constituting a stack of prescribed weight, and said stacker actuation means operates to rotate said unit to simultaneously transfer the stack of preselected number of slices and present another station of said unit to the discharge end of said slicing machine so that slices for the next succeednig stack can be received thereby.

5. The invention in accordance with claim 4, wherein said unit includes adjustment means for adjusting the effective slice receiving area of each station as the dimensional characteristics vary of the particular products to be sliced.

6. The invention in accordance with claim 1, wherein said conveyor means includes a constantly driven weigh conveyor supported by said weighing means.

7. The invention in accordance with claim 1, wherein said feedback means gradually corrects said control means of said slicing machine in preset increments and of a duration corresponding to the registered magnitude of the weight over and under the prescribed weight.

8. The invention in accordance with claim 1, wherein said reject means includes a constantly driven underweight conveyor in proximity to the reject conveyor, said reject means being operatively connected with said reject conveyor such that said reject conveyor is shifted whereby underweight stacks of sliced product will be prevented from travelling on to the correct and overweight conveyor and will be deposited on said underweight conveyor.

9. The invention in accordance with claim 8, wherein control means are operatively connected between said weighing means and said reject means for actuating said reject means when an underweight stack of slices is registered by said weighing means to shift said reject conveyor so that the underweight stacks can be deposited on said underweight conveyor.

10. The invention in accordance with claim 9, wherein the control means operatively connected between said weighing means and said reject means further includes means for actuating said reject means for returning said reject conveyor to its starting position at which correct and overweight stacks of sliced product are transferred thereon from said conveyor means to the conveyor for correct and overweight stacks of sliced product.

11. The invention in accordance with claim 1, wherein said slicing machine includes a feed bed on which the product to be sliced is adapted to travel into the slicing blade upon actuation by said pusher, said bed comprises a plurality of rolls on which said product to be sliced is adapted to travel for purposes of reducing the friction between the product to be sliced and said bed.

12. The invention in accordance with claim 1, wherein said slicing machine comprises a bed on which said product to be sliced is to travel into said slicing blade upon actuation of said pusher and said bed comprises means for minimizing the friction between the product to be sliced and said bed.

13. The invention in accordance with claim 1, wherein said slicing machine comprises a bed on which said product to be sliced is to travel into said slicing blade upon actuation of said pusher and said bed comprises means for minimizing the friction between the product to be sliced and said bed and said bed comprises a movable chain having gripping means for engaging said product to be sliced so that the tendency of said product to be sliced to buckle upon restarting of its feed into said slicing blade after the operation of said feeder has stopped is eliminated.

14. The invention in accordance with claim 1, wherein said slicing machine includes a product gripping means operatively associated with said pusher for gripping said product as it is being fed into said slicing blade by said pusher.

15. In combination with a slicing machine having an eccentric rotary blade, a rotatable shaft mounting said blade at one of its ends, a reciprocally mounted pusher for feeding a loaf of meat product to be sliced into said blade, and control means for determining the rate of advance of said pusher towards said slicing blade and consequently the slice thickness, apparatus for stacking a preselected number of slices as they are discharged by said slicing machine and then transferring the stacks of sliced meat product that are of a prescribed weight and rejecting those stacks that are under weight, said apparatus comprising in combination: an intermittently rotatable turret stacker located adjacent the discharge end of said slicing machine and defining a number of circumferentially disposed receiving platforms and a corresponding number of pockets such that the slice discharged by said slicing machine will rest on a particular platform and the predetermined number of slices accumulated in the associated pocket; timing means for determining the predetermined number of slices discharged by the slicing machine; drive means coupled with said stacker and said timing means for rotating said stacker to position the next succeeding stacker platform in slice receiving position upon the discharge of the predetermined number of slices; pusher stopping means operatively interconnected between said pusher and said timing means for stopping the operation of said pusher when said predetermined number of slices has been discharged; synchronization means for cooperating to delay the operation of said pusher stopping means for assuring a full last slice of said product before said pusher is stopped; pusher restarting means for reinitiating the operation of the pusher upon the expiration of a sufficient period of time for the stack of sliced product to be transferred away; a further synchronization means for permitting the operation of said pusher restarting means only at a predetermined relative position of said slicing blade; weight conveyor means proximate said stacker for receiving thereon the stacks of sliced product transferred by said stacker, a scale supporting said weight conveyor means and set to register upon detection of weights of stacks other than those having the prescribed weight; feedback means for receiving the signals produced upon actuation of said scale by the registered weights, interpreting said signals and then transferring said signals to said control means to adjust the rate of advance of said pusher and slice thickness to thereby correct the weights of the stacks of predetermined slices of said product so that they fall within said prescribed weight; a further transfer conveyor means for carrying stacks of slices within the prescribed weight and overweight stacks away from said weight conveyor means; reject means coupled with said scale for rejecting stacks of sliced product that are underweight; and reject conveyor means for transferring stacks of sliced product possessing weights under said prescribed weight such that these stacks are readily discernable from the stacks within said prescribed weight and the overweight stacks.

16. For use in combination with a slicing machine having a slicing blade, a reciprocal pusher for feeding a product to be sliced into said blade, and control means for determining the rate of advance of said pusher towards said blade and, consequently, the slice thickness, apparatus for stacking a preselected number of slices of said product as they are discharged by said slicing machine and then transferring the stacks of sliced product that are of a prescribed weight and rejecting those stacks that are other than such prescribed weight, said apparatus comprising in combination: a stacking means to be located adjacent the discharge end of said slicing machine for receiving the slices discharged therefrom; slice counting means for determining the preselected number of slices discharged from the slicing machine; stacker actuation means coupled with both said stacking means and said slice counting means for actuating said stacking means to transfer the stack of preselected number of slices of said product and ready said stacking means for reception of another stack of slices; conveyor means in stack receiving position adjacent said stacking means, and adapted to receive thereon the stacks of sliced product transferred by said stacking means; weighing means operatively connected with said conveying means such that it is adapted to register the weight of the individual stacks conveyed thereon; servo mechanism adapted to be coupled with said control means of said slicing machine and adapted to be actuated to thereby correct the adjustment of said control means of said slicing machine to adjust the rate of advance of said pusher and, consequently, the slice thickness; feed back means operatively connected with said weighing means and said servo mechanism for feeding back signals to such servo mechanism corresponding to the weight of the individual stacks over and below said prescribed weight for the preselected number of slices to thereby automatically actuate said servo mechanism to correct the adjustment of said control means of said slicing machine to respectively decrease and increase the rate of advance of said pusher and, consequently, decrease and increase the slice thickness; reject means for rejecting stacks of sliced product that are underweight; and electrical means electrically coupling said reject means with said weighing means to cause said reject means to be actuated to reject a stack of sliced product following registration of underweight of this stack by said weighing means.

References Cited in the file of this patent

UNITED STATES PATENTS

| | | |
|---|---|---|
| 2,060,540 | Straeten | Nov. 10, 1936 |
| 2,103,567 | Van Berkel | Dec. 28, 1937 |
| 2,169,897 | Lueckel | Aug. 15, 1939 |
| 2,687,207 | Meyer | Aug. 24, 1954 |
| 2,812,792 | Allbright | Nov. 12, 1957 |
| 2,845,970 | Folk | Aug. 5, 1958 |
| 2,898,962 | Burnett | Aug. 11, 1959 |
| 2,903,032 | Cervene | Sept. 8, 1959 |
| 2,969,099 | Gillman | Jan. 24, 1961 |
| 2,989,104 | Good | June 20, 1961 |
| 3,010,499 | Dahms et al. | Nov. 28, 1961 |

FOREIGN PATENTS

| | | |
|---|---|---|
| 853,760 | Great Britain | Nov. 9, 1960 |